United States Patent [19]

Bassett et al.

[11] 4,019,250

[45] Apr. 26, 1977

[54] METHODS OF FABRICATING A CONNECTOR WITH A PERFORABLE INSULATIVE LINER

[75] Inventors: Henry C. Bassett, Addison; Charles A. From, Jr., Elmhurst, both of Ill.; John F. Parker, Dubuque, Iowa; Ansel A. Worley, Lombard, Ill.

[73] Assignee: Western Electric Company, Inc., New York, N.Y.

[22] Filed: July 21, 1975

[21] Appl. No.: 597,742

[52] U.S. Cl. .................................. 29/629; 29/753; 174/84 C; 174/93; 339/98

[51] Int. Cl.[2] ....................................... H02G 15/00

[58] Field of Search ................. 29/203 P, 628, 629, 29/433, 241, 630 R, 203 DT, 630 A, 629, 203 R 203, D; 174/93, 94 R, 84 C, 84 R, 84 S; 53/198 R, 198 X; 339/95 R, 91 R, 97 R, 97 C, 98, 276 C, 278 R

[56] References Cited

UNITED STATES PATENTS

| | | | |
|---|---|---|---|
| 3,201,860 | 8/1965 | Horberg | 29/629 |
| 3,410,950 | 11/1968 | Freudenburg | 174/84 |
| 3,781,985 | 1/1974 | Yonkers | 29/629 |
| 3,839,595 | 10/1974 | Yonkers | 29/628 X |
| 3,861,033 | 1/1975 | Updyke et al. | 29/628 |
| 3,909,936 | 10/1975 | Ray | 29/629 |

OTHER PUBLICATIONS

Western Electric Technical Digest, No. 34, Apr. 1974, pp. 27–28.

*Primary Examiner*—James R. Duzan

*Attorney, Agent, or Firm*—K. R. Bergum; R. P. Miller

[57] ABSTRACT

An open-ended, B-wire type of deformable connector has a thin, perforable insulative liner secured to the inner surface of the inner one of a pair of telescopically coaxially disposed metallic sleeves in accordance with several preferred liner assembly methods. The liner is positioned so as to overlie the distal ends of an array of insulation-piercing protuberances formed in the inner sleeve, and to extend continuously in both the circumferential and longitudinal directions at least to the perimeter of the array. During assembly, while the inner sleeve is being fabricated out of strip stock in a progressive manner, each liner in the form of a section of thin, plastic film stock is positioned on and firmly secured (such as by pressure bonding) to the partially fabricated planar sleeve section along at least the solid wall border regions thereof (surrounding the array of protuberances). As such, the assembled liner not only remains taut in the axial direction while overlying the distal ends of the protuberances of the fabricated sleeve, but presents no peripheral edge obstruction to inserted conductors, particularly at the open end of the composite connector as assembled. The preferred methods of assembling the liners are also advantageously conducive to high volume, automated manufacture, at minimal cost, as such assembly may be carried out sequentially with the work functions normally performed on the strip stock from which the inner sleeves are fabricated.

30 Claims, 39 Drawing Figures

FIG. 10
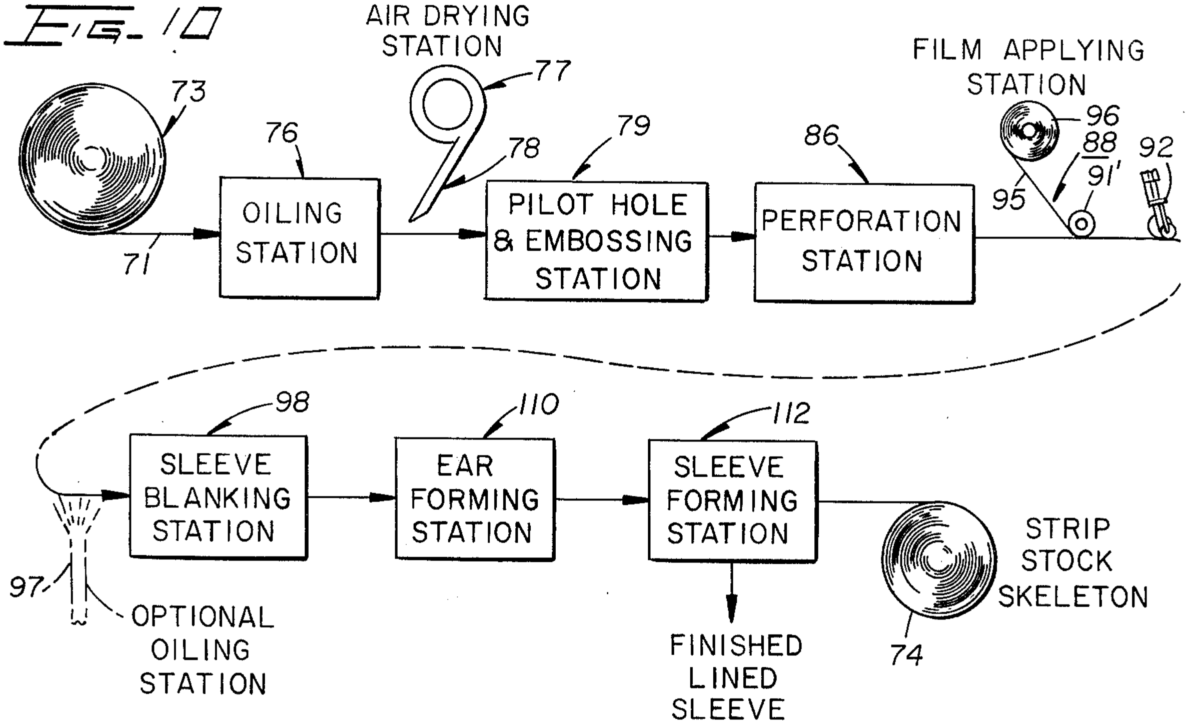
FIG. 16
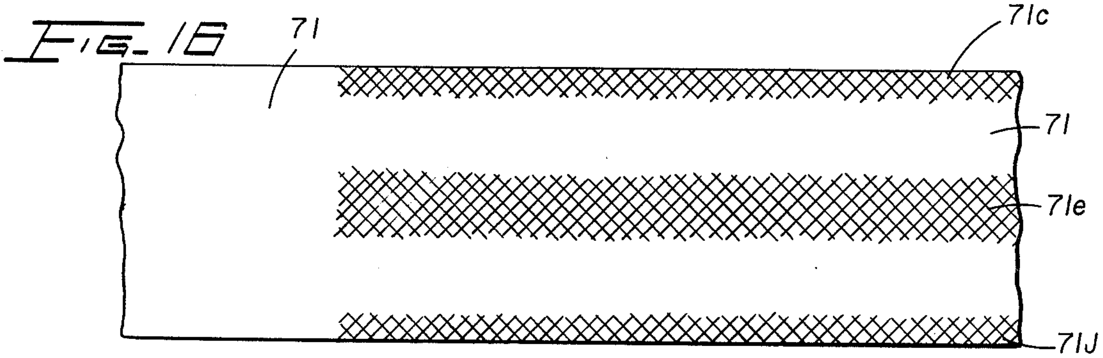
FIG. 17A SAME AS FIG. 11A
FIG. 17B SAME AS FIG. 11B
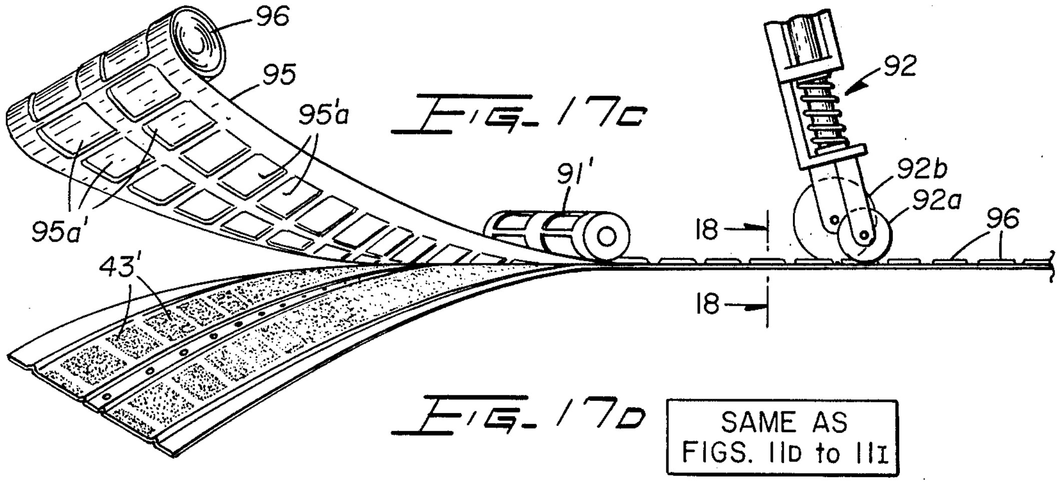
FIG. 17C
FIG. 17D SAME AS FIGS. 11D to 11I FIG. 22E
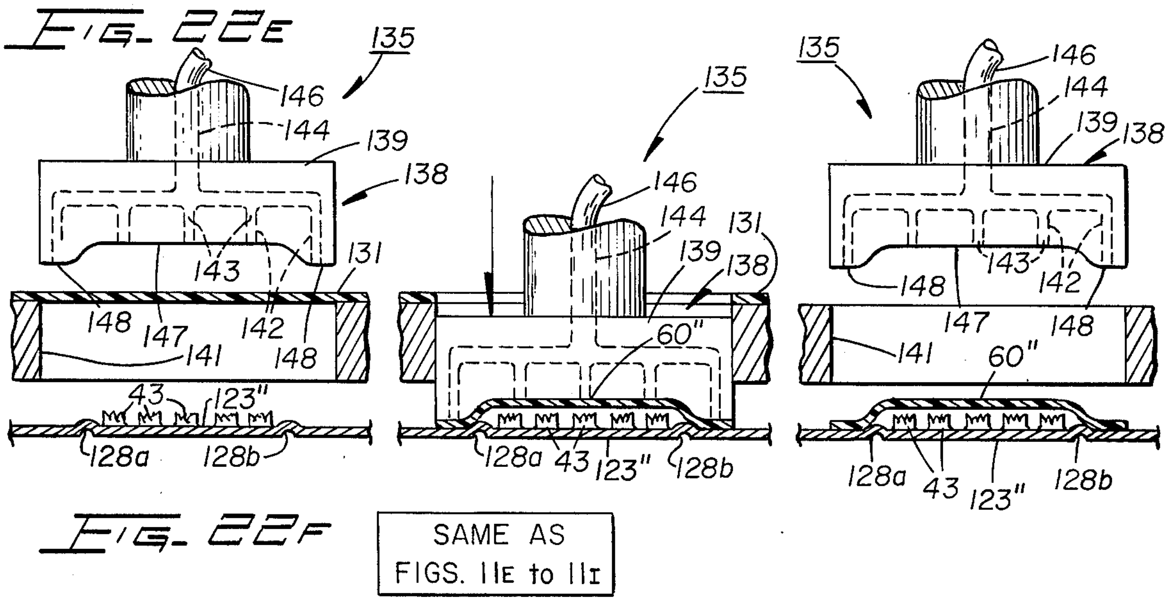
FIG. 22F
SAME AS FIGS. 11E to 11I
FIG. 23
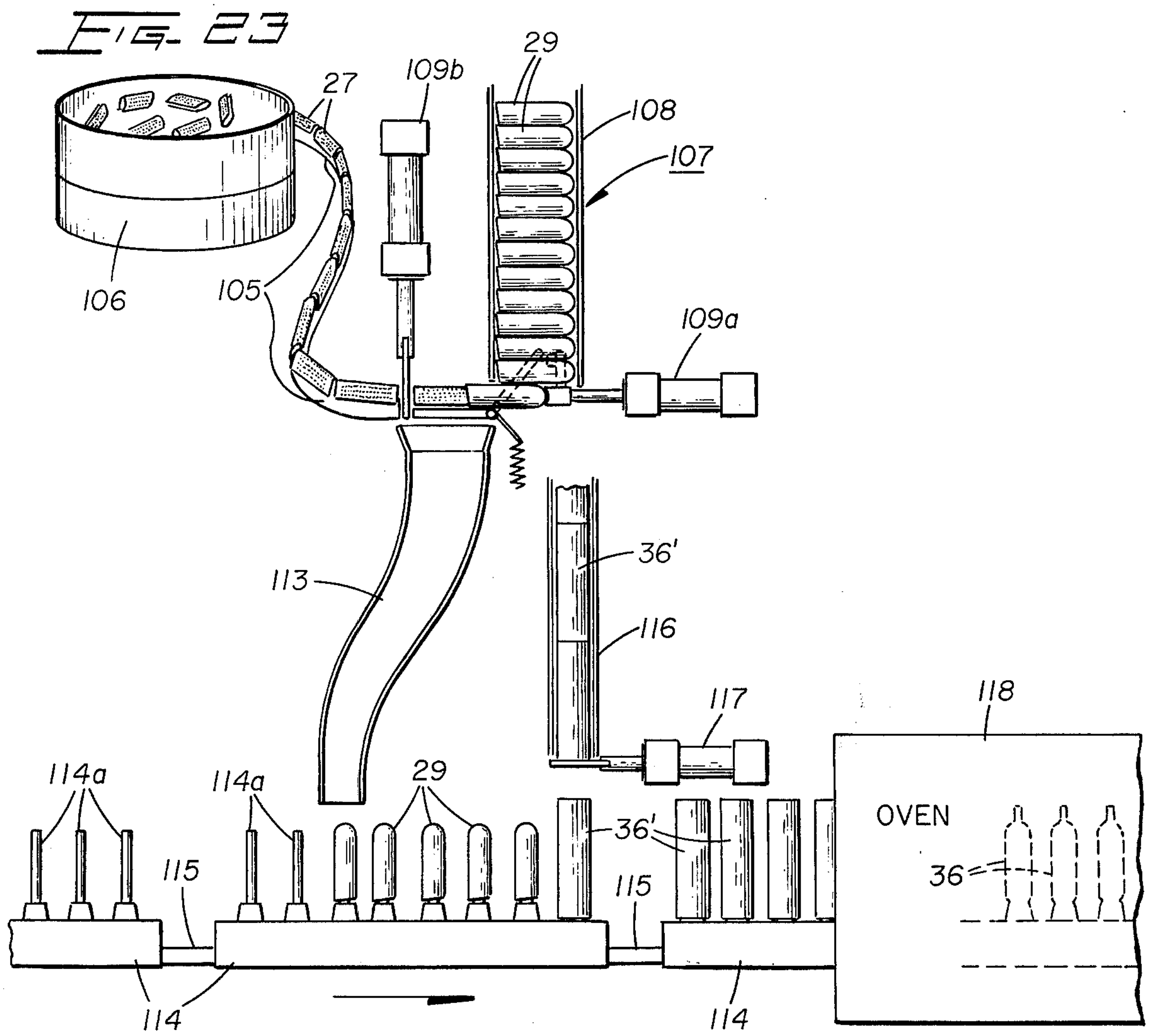

METHODS OF FABRICATING A CONNECTOR WITH A PERFORABLE INSULATIVE LINER

BACKGROUND OF THE INVENTION

1. Field of the Invention

This invention relates generally to solderless electrical connectors of the open-ended deformable type and, more particularly, to such connectors which incorporate conductor insulation-piercing protuberances and inner perforable insulative liners, and to methods of fabrication therefor.

2. Description of the Prior Art

Electrical connectors of the solderless, open-ended type, incorporating a pair of coaxially positioned and deformable sleeves, confined within an outer insulative jacket, have been employed for many years to provide reliable electrical connections between insulated conductors inserted therewithin. Such connectors have found extensive use, particularly in the communications industry, in the splicing or joining of diverse conductors and/or cables such as employed in telephone switching equipment.

One early type of such a connector is disclosed in U.S. Pat. No. 3,064,072, of H. J. Graff et al. As disclosed therein, an inner metallic sleeve, preferably made of hard, spring-tempered metal, is formed with a plurality of preformed, spaced apart perforations defining inwardly extending protuberances, such as in the form of prongs or tangs. These protuberances are dimensioned and arranged so as to pierce the insulation of insulated conductors after the latter have been inserted within the inner sleeve, and in response to a crimping force exerted on the outer insulative jacket. The outer sleeve of the Graff et al connector is formed of a relatively soft, malleable material that will result in that sleeve remaining in a deformed configuration after the connector has been crimped. This insures that the protuberances of the inner sleeve, of spring-like material, will remain in reliable, permanent, biting contact with the metallic core portions of the insulative conductors.

Notwithstanding the many attributes of connectors of the above-described type, there has been a troublesome and well recognized problem encountered in their use heretofore when constructed as thus far described. More specifically, because of the presence of the inwardly extending protuberances formed in the inner sleeve, the free-ends of conductors have had a tendency to hang-up on the protuberances while being telescopically inserted within the open end of the connector to the desired depth. While back and forth motion of the conductors, generally accompanied with a slight tilting or skewing thereof, will normally free the ends from obstructing protuberances, this is time consuming, and often results in an assembler in the field not always knowing if the free end of each inserted conductor has actually bottomed.

One approach taken to resolve this problem heretofore has involved inserting a strip of thin, insulative film, folded into a U-shaped configuration, within the bore of the inner sleeve of open-ended connectors of the type in question. Such an inserted film functions as a perforable liner, by initially overlying the distal ends of at least the majority of the protuberances and, thereby, provides a relatively smooth wall surface for receiving the free ends of the conductors.

U.S. Pat. No. 3,784,731, of Thomas Newbold discloses one such U-shaped liner that is retained within the inner sleeve by reversibly bent external extensions which are sandwiched between the outer surface of the outer metallic sleeve and the inner surface of the insulative jacket of the composite connector. Such a liner and technique for supporting it disadvantageously requires considerable manipulating of the liner during assembly, and necessitates a separate, time consuming operation, as well as specialized and relatively expensive apparatus is performed in a high volume, automated manner.

A somewhat different approach to supporting a similar loosely positioned U-shaped liner is disclosed in U.S. Pat. No. 3,839,595, of John L. Yonkers. In one preferred embodiment of that reference, outer free ends of the liner that extend beyond the open end of the connector are folded back against an outer flange area of the jacket and secured thereagainst, preferably by a separate elastic band. The need for such an auxiliary band not only increases the total costs of the liner, but is also time consuming in that it requires both an additional assembly operation, and rather expensive and complex liner and band assembly apparatus. In addition, such elastic bands have a tendency to become detached from the outer flange of the jacket due to external conditions, such as vibration during parts feeding or shipment, or handling in the field.

Regardless how the outer folded-back leg portions are secured to the connector, the loose, inner leg portions of the liner have a tendency to become wrinkled and, thereby, produce their own form of obstruction either at the open end of the connector, or at some point inwardly therealong. When that happens, the liner may very readily compound the very problem which it was intended to obviate, namely, preventing the protuberances from obstructing the free ends of conductors when inserted within the connector.

The general configuration of the aforementioned U-shaped liners employed heretofore have also been found wanting in a number of other material respects. More specifically, because of the relatively small inside dimensions of the inner sleeve bore, typically being of the order of 0.050 inch by 0.110 inch when elliptical in shape, it is very difficult, even with sophisticated assembly apparatus, to reliably and consistently insert a strip of relatively thin plastic film within the sleeve so as to overlie all of the protuberances. To accomplish this, the two major U-shaped leg portions must not be fully inserted within the inner sleeve, but have their mutually disposed and longitudinally extending leg portion edges ideally in mating relationship so as to form a liner with an essentially continuous circumferentially and longitudinally extending wall area. This is important if the liner is to overlie the distal ends of all of the protuberances, as the latter typically are formed in a continuous circumferential array about the inner surface of the inner sleeve. If the linerdefining plastic strip should become slightly misaligned while being inserted within the sleeve, or if it is intentionally made wider than ideally necessary to insure that it is completely contiguous with the inner surface of the associated sleeve, then the longitudinal edges of the major leg portions would necessarily overlap so as to further restrict the effective bore dimensions of the sleeve.

Another disadvantage of U-shaped liners is that the amount of film material required therefor must be substantially larger than that actually required to overlie the array of protuberances because of the generally employed outer folded-back leg portions. Even when the latter are not employed, however, the U-shaped liners proposed and utilized heretofore have at least had extended leg portions that are secured to the inner surface of the jacket adjacent the open end thereof (as distinguished from being secured to the upper peripheral edge region of the inner sleeve). Such liner securement has the disadvantage of further restricting the effective bore of the connector, by exposing the peripheral edge of the liner as an additional obstruction to the free ends of conductors when inserted therewithin.

A different approach taken heretofore to obviate the problem of inserting conductors within a deformable openended connector having sharp, inwardly extending protuberances has resulted in the so-called channel type connector, characterized by having a completely open side as assembled. The advantage of such a connector, in the absence of any type of liner, is that conductors may be readily inserted laterally into the recessed channel area of the conductor with a minimal amount of obstruction by insulation-piercing protuberances formed therein.

One connector of the aforementioned open-sided type is disclosed in U.S. Pat. No. 3,410,950, of W. P. Freudenberg. In connection with the channel member of that connector, a thin plastic film is employed to cover both the inner and outer surfaces of and, thereby, hermetically seal the member therewithin. The purpose of the film, it should be noted, is not to facilitate the insertion of conductors within the recessed area thereof (as one side of the assembled conductor is completely open), but rather, to allow a sealing paste to be initially confined adjacent the protuberances, and to thereafter effect a permanent hermetic seal when the film is ruptured. More specifically, upon the crimping of the channel-forming connector about one or more insulated wires inserted laterally therewithin, the inner film is ruptured and the sealant flows around, and seals, the interface between the wire and the connector projections.

Freudenberg suggests that the inner film, which necessarily overlies the protuberances extending upwardly from the base of the channel member, may be applied and secured to select inner surface areas thereof by a wellknown vacuum forming or drawing technique. This technique involves laying the film over the open side of the channel member and then drawing the film downwardly against the inner side walls thereof by applying a partial vacuum (through openings in the channel member) to the underside of the film.

Unfortunately, such a vacuum drawing technique would be totally ineffective with respect to the inserting of a thin section of film into a fabricated open-ended sleeve, with the film thereafter being drawn into the desired circumferentially and longitudinally disposed liner configuration. This follows, in part, from the fact that the depth of the draw is substantially greater than the narrowest width dimension of the sleeve, hence the amount of vacuum required would be excessive. Moreover, the fabricated sleeve is not only open at both ends, but substantially porous over a substantial wall portion thereof. Thus, an effective vacuum would be almost impossible to establish for any type of film assembly operation to be performed therewithin.

In addition, a vacuum drawing technique also does not readily lend itself to the securing the either an adhesive backed or heat-sensitive ionomer film, for example, to sleeves even while still in a partially fabricated strip stock configuration (conductive to an automated fabricating process, such as carried out with progressive punch and die apparatus), for several reasons:

First, the only areas of a planar sleeve section that a film could be effectively vacuum drawn against would be the distal ends of the perforation-formed proturberances. This could lead to detrimental premature rupturing of the film.

Secondly, and equally important, is the fact that in order for any film-defining liner for sleeves of the openended type not to present an open end obstruction itself, the liner must either (1) include leg extensions, so as to provide a smooth, tapered wall transition extending inwardly of the normally necked-down jacket region, or (2) in some way be firmly and reliably secured to the unperforated, circumferentially disposed open end region of each sleeve as fabricated.

The first mentioned liner assembly condition, of course, is accomplished with U-shaped liners that are folded back outside the open end of the connector jacket. As to the second alternative liner assembly condition, a vacuum drawing technique could not be relied upon because of the solid wall construction of the sleeve between the border edges thereof and the adjacent perimeter of the array of protuberances. Such border areas are required, of course, not only to give the fabricated sleeve the necessary rigidity, but to prevent the formation of sharp, jagged edges that would otherwise result from partially formed perforations along the peripheral edges of the sleeve.

It thus becomes readily apparent that a vacuum drawing, film securing technique of the type disclosed in the Freudenberg patent, which, it should be noted, is only intended for use in hermetically sealing open-sided connectors, would be completely ineffective for use in the fabrication of open-ended sleeves, either during or after the fabrication of same. Notwithstanding that fact, such a connector, even with such a deposited film that inherently could function as a liner therein, has a number of disadvantages as compared to the open-ended, telescopically disposed sleeve type connector. For example, the open-sided connector is generally more difficult for an installer to handle and manipulate while inserting conductors therewithin to effect an electrical connection. Open-sided connectors also have a tendency to become entangled while in bulk form, and generally require more tooling to produce the necessary double-sided walls and protuberances during manufacture, as well as more complex tooling to effect the crimping thereof to effect a subsequent electrical connection with conductors mounted therewithin. Such connectors, of course, also do not readily lend themselves to being taped in pairs between upper and lower flexible transporting tapes, for example, so as to not only allow automated transport of the connectors to a cable or wire splicing station, but to allow the cables or wires in pairs to be telescopically inserted therein.

For the foregoing reasons, the open-ended, sleeve-type connector with a perforable U-shaped film strip has gained much greater acceptance in the communications industry heretofore than the open-sided type, with or without an insulative film encapsulating the channel thereof.

What has nevertheless remained as a serious impediment to the otherwise very advantageous attributes and features of the open-ended B-wire type of connector, when incorporating an internal U-shaped liner, has been the difficulty, time and expense involved heretofore in assembling such a liner within the inner insulation-piercing sleeve after the latter has been completely fabricated.

SUMMARY OF THE INVENTION

It, therefore, is an object of the present invention to position and secure a thin, insulative film-formed liner within the boundaries of the inner sleeve of an open-ended, B-wire type of connector so as to overlie the inwardly projecting protuberances thereof continuously in a circumferential, as well as longitudinal direction, and in an automated manner that is not only conducive to high volume production, but produces a connector of improved construction and low cost.

In accordance with the principles of the present invention, the above and other objects are realized in one preferred illustrative method for making open-ended, deformable connectors wherein a thin, perforable insulative film is selectively secured, such as by bonding, to one side of indexably advanced metallic strip stock from which the inner sleeves of the connectors are progressively embossed, perforated, blanked out and formed. It is to be understood herein that reference to an open-ended, deformable connector primarily relates to those of the so-called B-wire type, incorporating a pair of telescopically coaxially disposed metallic sleeves positioned within an outer insulative jacket, and wherein the inner sleeve is formed with a plurality of inwardly extending insulation-piercing protuberances. While such connectors are typically of small size, they may be of any size to accommodate a given gauge of insulated wire, and may be of any desired open-ended hollow shape, such as elliptical or cylindrical.

In accordance with one preferred method of assembly, the film-defining liner is initially secured to the metallic strip stock after a plurality of perforation-defining, insulation-piercing protuberances have been formed in arrays within each of a succession of longitudinally spaced (and preferably juxtaposed pairs of) sleeve-defining planar regions. Thereafter, each such region (together with a secured, overlying portion of film) is substantially blanked out into an I-beam shaped sleeve section and then formed into a hollow (typically elliptical) lined sleeve prior to being completely severed from the remaining strip stock skeleton. The composite inner sleeve and liner are then inserted within an outer sleeve of malleable material, with at least the outer surface of the latter confined within an insulative jacket (preferably formed from heat shrinkable plastic tubing) so as to form a completely assembled connector.

Considering the securement of the liner to the sleeve more particularly, the liner while still in roll stock form is preferably roller bonded along the narrow, longitudinal, non-perforated border regions of the sleeve-forming strip stock while still in planar configuration. These border regions ultimately define the narrow, circumferentially disposed end regions of the inner sleeve as finally fabricated. Such securement significantly allows the open-end peripheral edges of both the inner sleeve and liner to be at least partially recessed beneath a shoulder portion of the outer jacket, when formed with a necked-down portion that merges into an outer tapered flange portion near the open end thereof. This, of course, insures that conductors can be inserted within the conductor without encountering any troublesome obstruction.

Concomitantly, with the liner secured to the inner sleeve as described, it becomes readily apparent that the major central surface area of the liner that overlies the distal ends of the array of protuberances will remain taut in the axial direction of the sleeve at all times, at least prior to the crimping of the connector. As such, the liner exposes a central connector bore with a smooth wall area, and a substantially uniform cross-section along the major axial length of the connector. Moreover, such a liner, by being confined within the border edges of the inner sleeve, substantially reduces the amount of liner material required as compared to U-shaped liners with either extended or folded back leg portions. Another unique aspect of the subject liner is that it may be readily applied to the sleeve-defining strip stock not only in an automated manner, but sequentially with the various work functions performed on the strip stock as it is indexably advanced through the sleeve forming apparatus, such as a multi-slide.

In accordance with another preferred illustrative embodiment of the invention, the film stock for the liner is formed, preferably as manufactured, with a longitudinal array of bubble (or dimple) areas that are spaced apart so as to respectively overlie the spaced arrays of inner sleeve perforations whenever formed in the strip stock. Such bubble areas allow the strip stock perforations to be formed after, as well as before, the film has been selectively bonded to the strip stock (or otherwise secured thereto), without the resulting protuberances prematurely perforating the liner. Such film also allows any adhesive employed for bonding purposes to be confined to only the mating interface regions of the bubble-formed film and strip stock. As such, neither the distal ends of the protuberances nor the inner surface of each overlying bubble area associated with a given sleeve would normally need to have an adhesive material applied thereto. This may be of particular importance in certain electrical application where even minute resistance or dielectric effects that could otherwise possibly be attributable to a given adhesive material cannot be tolerated.

In still another alternative method of assembling liners in open-ended connectors in accordance with the principles of the present invention, the insulative film stock is initially blanked out into small, discrete, postagestamp-like sections that are dimensioned to cover only the area of the protuberances associated with a given sleeve, and one or more very narrow border regions, including at least the side border that will ultimately be nearest the open end of the sleeve as formed. This method has the advantage of still further minimizing the amount of liner material required in those situations where the array of protuberances encompasses a central, circumferentially disposed area or band about the inner sleeve that is substantially smaller than the total wall area of the sleeve.

BRIEF DESCRIPTION OF THE DRAWINGS

FIG. 10 is a simplified, essentially diagrammatic view of a composite system for fabricating the inner sleeve and liner as a composite unit in an automated manner in accordance with one preferred method embodying the principles of the present invention;

FIG. 16 is an enlarged, fragmentary plan view of a section of sleeve-forming strip stock selectively striped with an adhesive in preparation for receiving a film-defining liner that is subsequently secured to the strip stock;

FIG. 17, comprised of FIGS. 17A-D, illustrates another unique sequence of operating steps involved in an alternative preferred method of progressively forming the inner sleeve of a B-wire type connector out of strip stock, while sequentially with such steps securing a bubble-formed, film-defining liner to the inner sleeve that allows the insulation-piercing protuberances to be formed either before or after the liner has been secured to the strip stock in accordance with the principles of the present invention;

FIG. 23 is a simplified, pictorial illustration of the apparatus involved in the assembly of the inner and outer sleeves, and in confining the assembled sleeves in an outer, heat shrinkable tube that forms a jacket.

DETAILED DESCRIPTION OF THE INVENTION

General Background of a Typical B-Wire Connector

Figure 2:
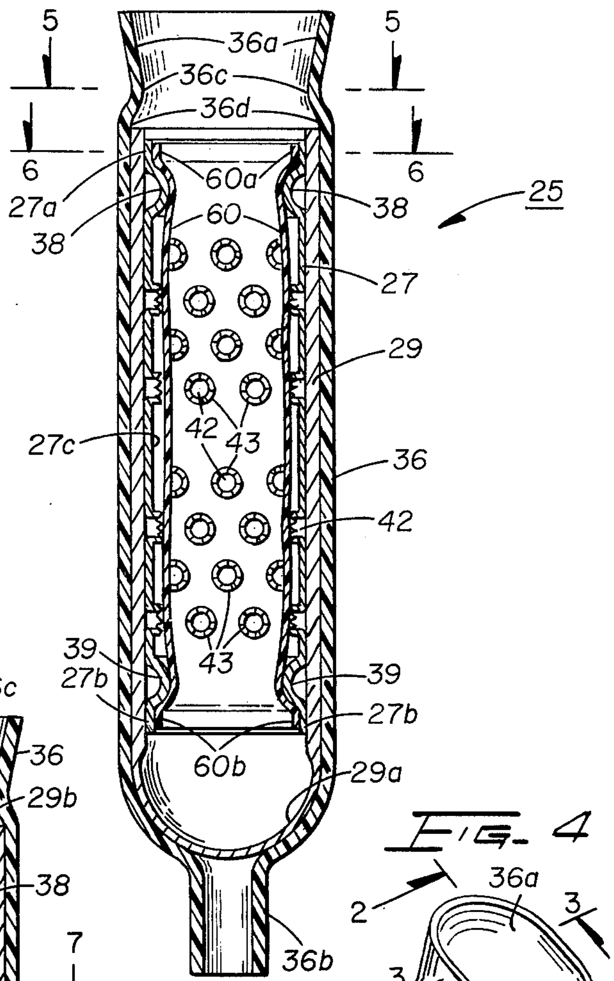
FIG. 2 is an enlarged, cross-sectional view, taken along the line 2—2 of FIG. 4, of a lined connector embodying the principles of the present invention.
Figure 3:
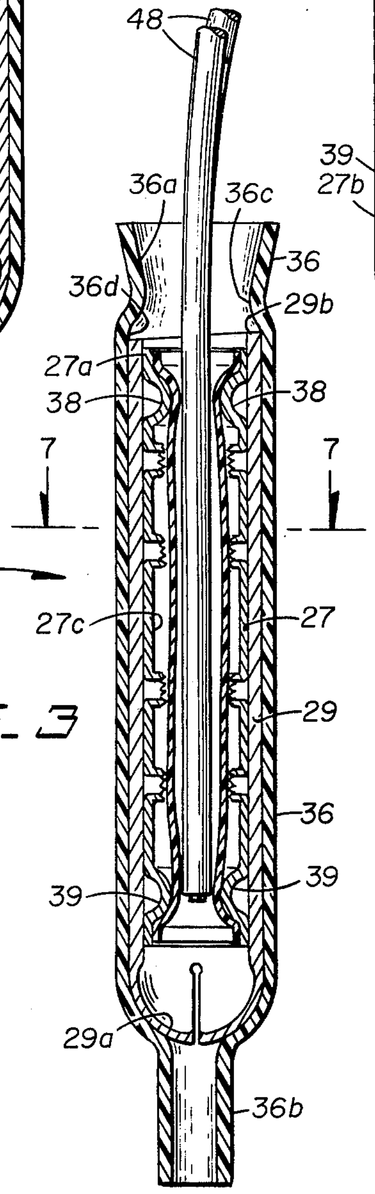
FIG. 3 is an enlarged, cross-sectional view, taken along the line 3—3 of FIG. 4, of the lined connector of FIG. 2, with a pair of conductors loosely inserted therewithin.
Figure 4:
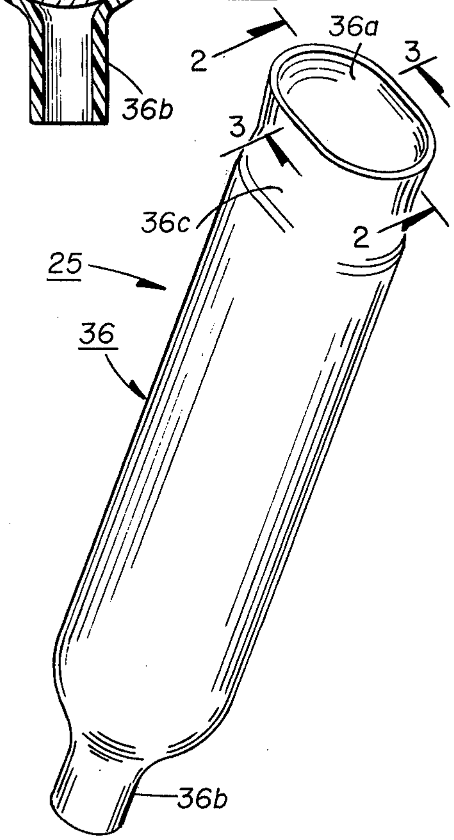
FIG. 4 is an enlarged, elevational perspective view of the lined connector of FIGS. 2 and 3.
Figure 5:
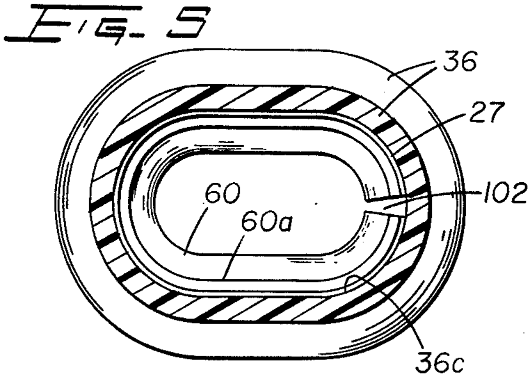
FIGS. 5 and 6 are enlarged, cross-sectional views of the connector taken along the lines 5—5 and 6—6 of FIG. 2.
Figure 6:
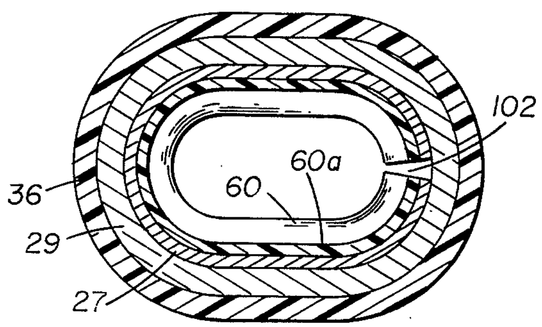

With particular reference first to FIGS. 2–4, a B-wire type of connector 25 is illustrated, comprised of three basic elements, namely, a first or inner metallic sleeve 27, a second or outer metallic sleeve 29 and an outer, substantially confining insulative jacket 36. The inner sleeve 27 is comparatively thin relative to the outer sleeve 29, and is formed out of a hard, spring-like material such as spring-tempered phosphor bronze. The inner sleeve 27 is open at both ends, and is preferably formed with embossed ridges 38, 39 near the respective ends primarily for the purpose of sleeve rigidity. The location of the upper ridge 38 also facilitates the guiding of the free ends of conductors within the assembled connector.

Figure 7:
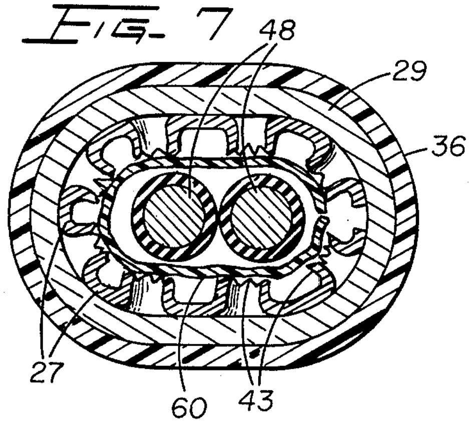
FIG. 7 is an enlarged, cross-sectional view of the connector taken along the line 7—7 of FIG. 3, and showing in greater detail the relationship between the inner sleeve protuberances, liner and a pair of insulated conductors disposed within the connector prior to the connector being crimped.
Figure 8:
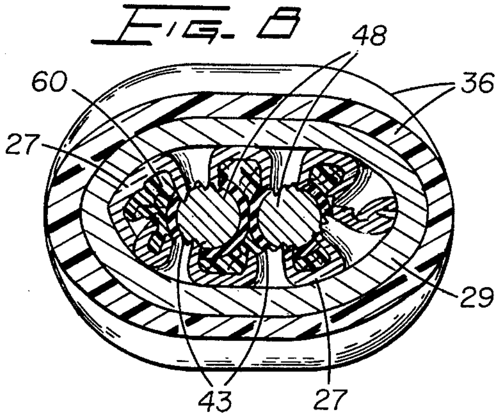
FIG. 8 is an enlarged, cross-sectional view of the connector as viewed in the same plane as depicted in FIG. 7, but after the connector has been crimped to cause the inner sleeve protuberances to pierce the liner and insulation of the conductors so as to make reliable and permanent contact with the cores thereof.

The inner sleeve 27 is also formed with a plurality of perforations 42 which define a plurality of inwardly extending, insulation-piercing protuberances 43. Each perforation 42 is preferably configured such that it produces a plurality of the inwardly extending protuberances that comprise sharp, knife-like barbs or tangs that terminate in sharply pointed distal ends. Such protuberances are formed to effectively pierce the insulation of conductors 38 when inserted within the connector (see FIGS. 3 and 7), upon the application of a crimping force exerted against the connector (see FIG. 8). These protuberances may be spaced in either a symmetrical pattern or in a random manner, but in either case they are preferably disposed in a circumferential array about the inner surface of the formed sleeve.

The outer metallic sleeve 29 is typically formed out of a soft, relatively malleable material, such as annealed brass, and is preferably fabricated to have a substantially closed lower end 29*a*. By being formed of readily deformable material, the outer sleeve 29 is permanently deformed by plastic flow in response to a crimping force exerted thereagainst through the outer jacket 36. This, in turn, insures that the protuberances 43, after having been displaced so as to pierce through the insulation of previously inserted insulated conductors, will permanently remain in reliable contact with the cores thereof.

As best seen in FIGS. 5–8, both the metallic sleeves 27 and 29 are generally of elliptical or oval transverse cross-sectional configuration. The inner sleeve 27 is dimensioned to be slightly smaller than the outer sleeve 29 so as to permit the coaxially telescopically disposed assembly of the former within the latter, preferably in press-fit engagement. To further facilitate such firm engagement, the inner sleeve may also be formed with one or more outwardly extending detents 45, such as the one depicted in a preferred embodiment of the invention in FIGS. 9, 11B and 14.

The outer plastic jacket 36 is preferably made from a thermoplastic heat shrinkable tubing, such as molded out of a polyolefin resin, which is initially dimensioned and positioned so as to extend slightly beyond both ends of the outer sleeve 29. Thereafter, the tubing is controllably heat-shrunk tightly about the outer sleeve 29 so as to form a flared-out open flange end 36*a* and a substantially closed or restricted end 36*b*, best seen in FIG. 4.

The configuration of the open end 36*a* advantageously facilitates the insertion of insulated conductors within the assembled connector. A necked-down region 36*c*, that merges into the flared-out end 36*a*, has been provided heretofore to provide a recessed shoulder area 36*d* (see FIGS. 2 and 3) intended to further facilitate the insertion of the free ends of conductors past the upper peripheral ends of the inner and outer sleeves 27 and 29. Unfortunately, however, this necked-down region 36*c* has not proven effective heretofore in facilitating the downward movement with ease of the free ends of the conductors past the longitudinally and circumferentially disposed array of inwardly extending protuberances 43.

PRIOR ART LINER FOR B-WIRE CONNECTOR

Figure 1:
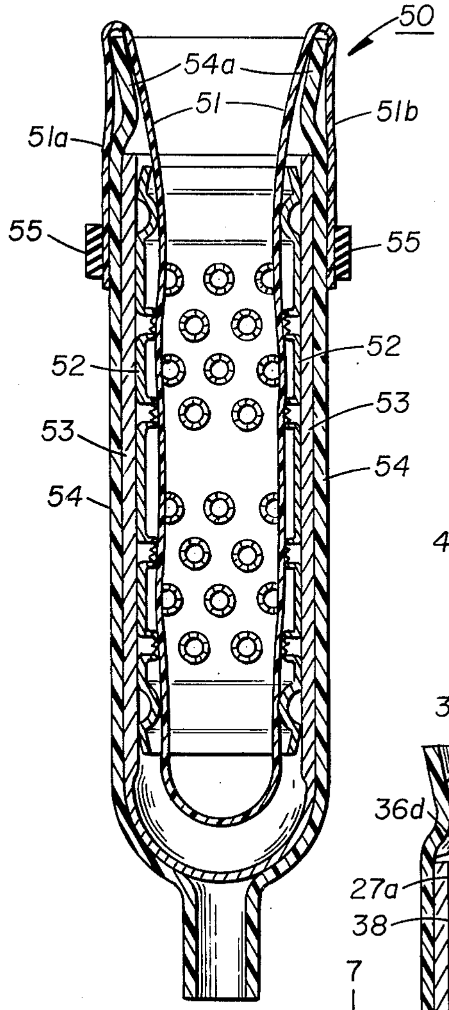
FIG. 1 PRIOR ART
FIG. 1 is an enlarged, cross-sectional view of a prior art lined connector.

One approach taken heretofore to overcome the tendency of the free ends of conductors to hang-up on the protuberances 43 has been to fabricate a connector 50, as depicted in FIG. 1 and labeled "Prior Art", with a U-shaped liner 51 disposed within an inner sleeve 52, and the latter being disposed within an outer sleeve 53. That liner, essentially comprising a narrow strip of plastic film, has normally been inserted within the inner sleeve 51 either manually or in connection with automated apparatus after the assembly of either the coaxially positioned sleeves or the composite connector. As illustrated, the prior U-shaped liner 51 is typically secured to the connector by outer folded-back leg portions 51*a*, 51*b* which are secured against the outer wall of a jacket 54 by a separately applied auxiliary elastic band 55. While such a liner 51 facilitates the insertion of insulated conductors within the assembled connector, both the insertion of such liners within the inner sleeve 52, and the securement thereof to the outer jacket 54 by a separate elastic band 55, not only appreciably increases the material costs of the composite lined connector, but necessitates separate costly and time consuming assembly operations.

Alternatively, as previously mentioned, it has also been proposed heretofore to secure the upper ends of the U-shaped liner 51 of the type depicted in FIG. 1 to either the inner or outer surfaces of the jacket 54 adjacent the open flange end 54*a* thereof, through the use of an adhesive, or by ultrasonic bonding. As also previously mentioned, a still further alternative proposal to fasten the prior art type of U-shaped liner 51 to the connector has been to insert folded-back extensions of the liner, such as the leg portions 51*a*, 51*b* of FIG. 1, between the outer surface of the outer sleeve 53 and the inner surface of the heat-shrunk jacket 54.

Regardless how a U-shaped liner of the type depicted in FIG. 1 has been formed and inserted within a B-wire connector heretofore, for the reasons pointed out in detail hereinabove, not only the material costs of such liners, but the time and costs involved in the assembly thereof, are substantial relative to the total costs of the fabricated connector. Further, such U-shaped liners by being supported only at or near the open end of the outer jacket 54, necessarily are suspended downwardly therefrom within the inner sleeve in a relatively loose manner. As such, the major inwardly extending leg portions of the liner have not always remained taut and fully extended within the bore of the inner sleeve 52. This often results in the liner presenting its own form of an obstruction to conductors by becoming wrinkled, or by portions thereof hanging-up on adjacent protuberances. When misaligned, such liners also leave both longitudinally extending gaps and bore-restricting overlapped regions.

PRESENT LINED CONNECTOR AND METHODS OF FABRICATING SAME

To overcome the aforementioned problems and disadvantages associated with the prior, loosely inserted U-shaped liner 51, several unique methods are disclosed herein for assembling a liner 60 within the inner sleeve 27 of the connector 25 of FIGS. 2–4.

Figure 9:
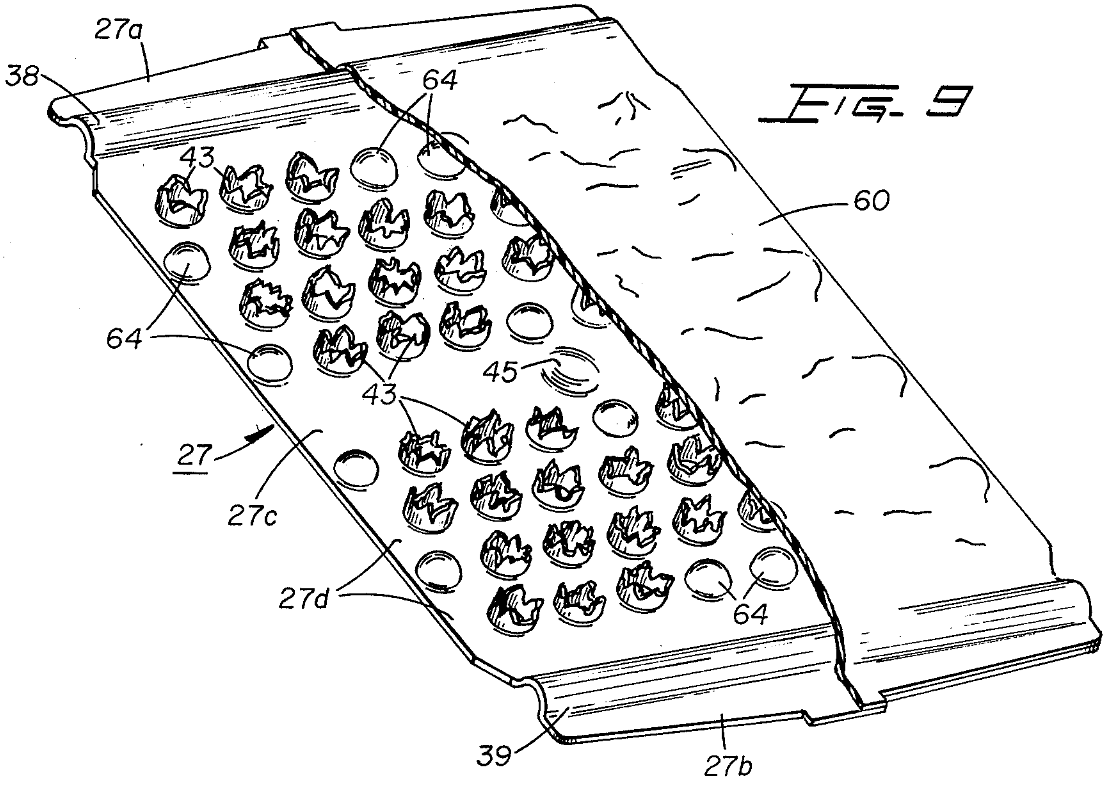
FIG. 9 is an enlarged, perspective view, partially broken away, in section, and folded open in the interest of clarity, of a completely fabricated lined sleeve embodying features of the present invention.

As best seen in FIGS. 2, 3 and 9, the thin perforable insulative liner 60 is dimensioned so as to not only completely overlie the distal ends of the array of insulation-piercing protuberances 43, but provide sufficient over-extending border areas to allow the securement thereof, such as by pressure bonding, to at least the upper and lower circumferentially disposed planar border areas 27*a* and 27*b* of the inner sleeve 27. With the liner also being bonded to portions of the adjacent raised ridges 38 and 39, the latter not only provide sleeve rigidity, but inherently function as spacers for the liner. Secured in this manner, the entire major central area of the liner 60 advantageously and significantly remains taut at all times in the axial direction thereof while overlying the distal ends of the protuberances 43. As such, the free ends of insulated conductors may be easily inserted past the protuberances to their fully extended depth within the connector, as depicted in FIG. 3. It should be appreciated that the liner 60 may also be secured to any other non-perforated area, such as about the mid-section 27*c* of the inner sleeve; however, this has not been found to be necessary in practice.

In order to minimize any possibility of the liner 60 being accidentally perforated by any of the protuberances 43, particularly those disposed along the edges of the array thereof, the inner sleeve 27 is preferably formed with not only the raised ridges 38, 39, but with a plurality of raised, inwardly extending dimples or detents 64. These detents are not only spaced in rows along both borders of the sleeve that are oriented transversely of the raised ridges 38, 39, but several are preferably located to replace perforations adjacent each raised ridge 38, 39 (see FIG. 9). The rows of border detents 64 also serve another important function, namely, to prevent the subsequently blanked-out sleeve from having any sharp, ragged edges which could otherwise exist if such detents were replaced by perforations, and if some of them were accidentally partially severed during the blanking operation.

Figure 11A:
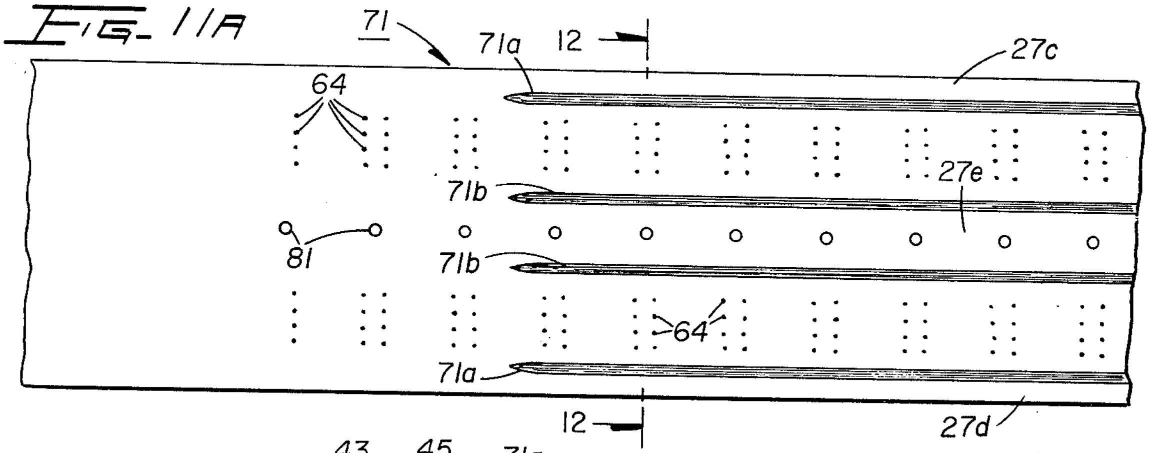
FIG. 11, comprised of FIGS. 11A-11I, illustrates one unique sequence of operating steps involved in one preferred method of progressively forming the inner sleeve of the connector out of strip stock, while sequentially with such steps securing a film-defining liner to the inner sleeve.
Figure 11B:
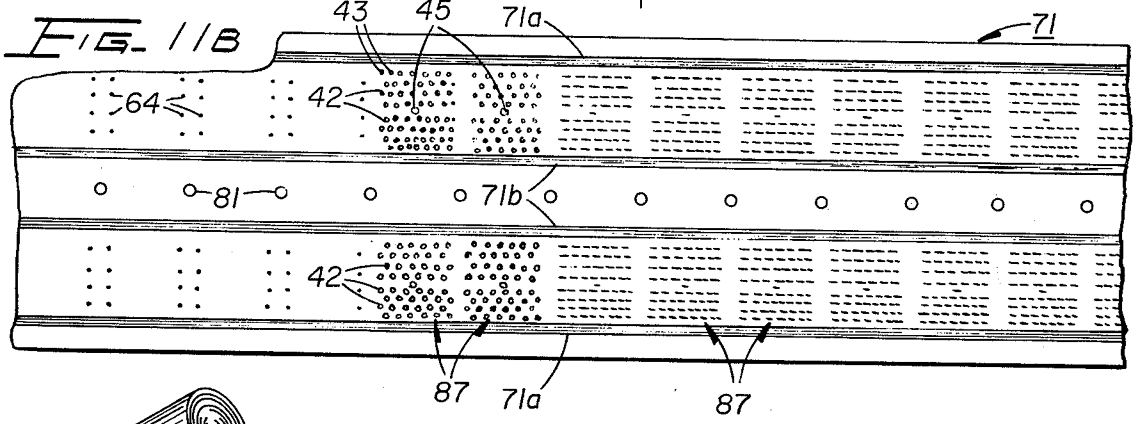
Figure 11C:
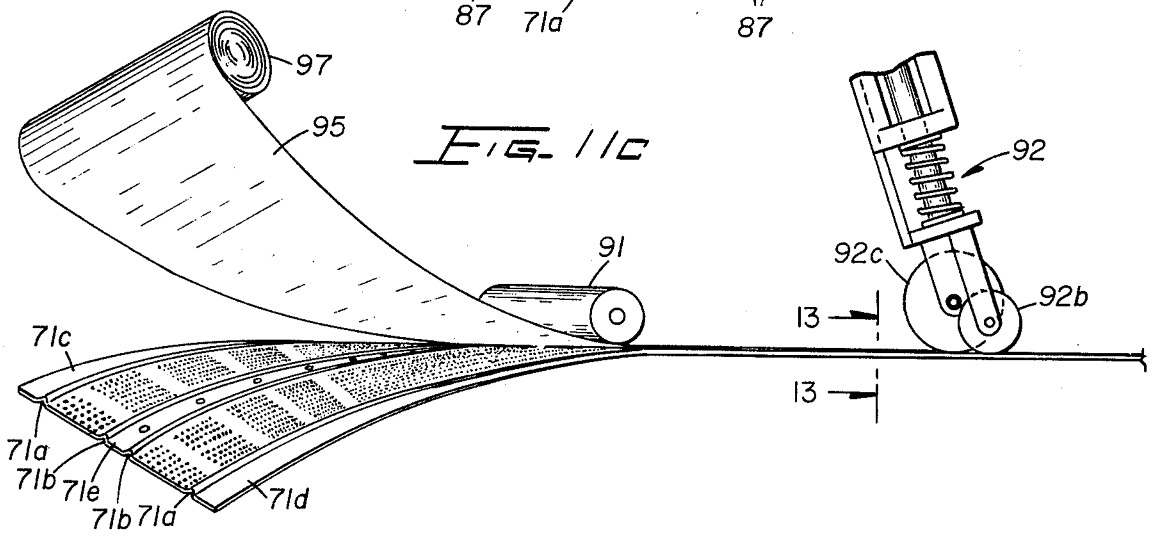

In accordance with the principles of the invention, the film-formed liner 60 may be readily bonded to the inner sleeve 27 while still in strip stock form, for example, by roller bonding an adhesive-backed film thereto, such as in the manner depicted in FIG. 11C. Several alternative methods for fabricating lined inner sleeves will be described in detail hereinbelow. At this point it will suffice to simply state that in addition to conventional adhesive-backed film, the liner 60 may also be secured to the inner sleeve by applying a suitable adhesive in a selective striped pattern to either the film which forms the liners 60 or to the strip stock from which the sleeves 27 are formed, one such adhesive pattern on the strip stock being depicted in FIG. 16. Alternatively, a heat sensitive ionomer film, which requires no special adhesive coating, may be employed to form the liner. Ultrasonic bonding, of course, is also applicable for use in securing film-defining liner stock to the sleeve-forming strip stock with or without an adhesive layer.

One preferred film for fabricating the liner 60 comprises a 0.0005 inch polyester film, with a particular thermosetting adhesive backing resistant to trichlorethylene, preferably having a thickness between 0.0001 inch and 0.001 inch, sold under the Code Number PSLI-30500, by the Minnesota Mining and Manufacturing Company. This film has been found not only to adhere very reliably to the sleeve-forming strip stock, but to provide sufficient strength to resist or prevent undesired piercing by the distal ends of the protuberances prior to the crimping of the connector.

In connection with bond strength, it has also been found that when the thickness of the adhesive of the type in question is at least 0.0005 inch, bond strength is not appreciably affected by the normally experienced physical surface variations of the strip stock. Minor variations in the degree to which the strip stock has been cleaned, and/or is free of foreign contamination, has also been found to have a minimal effect on bond strength whenever the adhesive in question is at least 0.0005 inch thick.

This is particularly important in the present liner assembly processes in that oil is applied to the strip stock during the fabrication of the sleeves to minimize wear of the tooling, particularly when progressive punch and die apparatus, such as a multi-slide, is employed to fabricate the inner sleeves 27 in an automated manner. As will be seen hereinafter, whenever the oil is applied to both sides of the strip stock prior to the film bonding operation, excess oil is preferably removed from the film bonding side thereof, and at least substantially dried, by the use of a jet of heated air. Nevertheless, a thin film residue of oil still remains on the bonding side of the strip stock.

Advantageously, however, the particular adhesive composition applied to the polyester film in question has been found to effectively absorb the thin film residue of oil with no substantial impairment of bond strength. By way of example, with only the partial removal of oil from the bonding side of the strip stock, i.e., with a thin film residue remaining, peel strengths of the bonded plastic film in question have been found to typically fall within a range of 15 to 25 ounces per inch of film width. This degree of bond strength is more than sufficient to allow the liner 60 to overlie the distal ends of the protuberances 43 in a smooth, taut condition, in the axial direction, at all times prior to the completion of an electrical connection, when the protuberances 43 then, and only then, perforate the liner.

Alternatively, of course, the oil may be applied directly to the back side of the strip stock, and indirectly to the front side thereof, by being deposited on the surface of the film after the latter has been bonded to the strip stock. In this case, the oil may be subsequently removed from the film during the normal chemical cleaning of the fabricated sleeves.

Other adhesives and films, of course, may be employed, being dependent on their compatibility with not only the surface condition of the sleeve-forming strip stock, but on the degree of heat and/or pressure applied during the bonding operation, and on the chemical solvents, if any, to which the liner (and/or adhesive) would be subjected during the fabrication of the composite connector. In regard to solvents, the polyester film in question has advantageously been found to be immune to hot trichlorethylene. This is employed to remove any possible residue of oil and any other contaminants from the coaxially disposed inner and outer sleeves 27 and 29 prior to their assembly as a unit. The particular type of film employed may also be dependent to a great extent on the maximum thickness dimension that can be tolerated for the liner, and on the dielectric, insulative and pierce-resisting characteristics exhibited by a given film in light of a particular connector application.

By way of further example only, other applicable insulative films for the liner 60 may comprise polyvinyl chloride, polystyrene, acrylonitrile butadiene styrene (ABS), acrylic, polycarbonate, vinylidene chloride or vinylidene fluoride, to mention a few. Should a different solvent other than hot trichlorethylene be employed to clean the sleeves, an ionomer resin film, such as sold under the tradename Surelyn A, by E. I. DuPont, may also be employed with good results. An ionomer film, of course, has the advantage that it can normally be bonded directly to most metallic strip stock materials by simply applying heat without pressure to effect the bond. An ionomer film, by not requiring a separate adhesive-backing or interface coating may have the following advantages in certain connector applications. First, the total effective thickness of the film may be minimized, so as not to appreciably reduce the effective inside bore diameter of the inner sleeve. Secondly, the absence of any interfacing adhesive layer obviates any possible voltage drop effects due to even a minute value of resistance exhibited by the adhesive composition. Such a resistance loss problem has not been found to be of significance, however, with the polyester adhesive backed film described herein.

From the foregoing description of the composite lined connector 60, as depicted in FIGS. 2 and 3, relative to the connector 50 of FIG. 1 with a prior art type of U-shaped liner 51, the present liner 60 exhibits the following advantages: First, in being firmly secured to the mating surfaces of the inner sleeve 27 adjacent both the upper and lower ends thereof, the major central surface area of the liner 60 always remains taut in the axial direction while overlying the distal ends of the protuberances 43. As such, the liner can never become wrinkled or bulge inwardly within the body of the assembled connector so as to itself present an obstruction to conductors when inserted therewithin.

Moreover, the liner and inner and outer sleeves are dimensioned and assembled such that the upper peripheral end regions thereof not only abut each other, but are substantially recessed under the shoulder 36*d* formed by the necked-down regions 36*c* of the outer jacket 36, as best seen in FIGS. 2 and 3. As such, the shoulder 36*d* effectively shields the upper peripheral edges of the liner and both sleeves from the free ends of conductors when inserted within the axial bore of the liner. After the free ends of the conductors pass by the necked-down region of the jacket 36*c*, the smooth wall area of the liner 60 reliably allows the conductors to be fully inserted within the body of the connector without in any way encountering the distal ends of any of the protuberances 43. As such, an installer or worker in the field may always be assured that the conductors that are manually inserted within a given connector will always reliably bottom prior to the crimping thereof to effect a permanent electrical connection between the inserted conductors. Such consistently attained full depth insertion of the conductors is very important as it, in turn, insures that a maximum, statistical number of protuberances 43 will make contact with the inner cores of the conductors in any given crimping operation. Finally, the liner 60 is much more conducive to high speed, low cost assembly than U-shaped liners for the various reasons now to be described.

AUTOMATED METHODS OF ASSEMBLING LINED INNER CONNECTOR SLEEVES

With particular reference first to the flow diagram of FIG. 10, a unique, automated, in-line manufacturing process is disclosed for assembling the liner 60 within the inner sleeve 27 of the connector 25 depicted in FIGS. 2–4. More specifically, in this one preferred process it is seen that the inner sleeve 27 is formed from strip stock 71, such as phosphor bronze, which is progressively advanced between a supply reel 73 and take-up reel 74, through a series of work stations before the fabricated lined sleeves 27 are severed from what remains as scrap in the form of a strip stock skeleton. Advancement of the strip stock 71, of course, may be effected not only by the take-up reel 74, but by laterally displaceable punch and die tooling, such as may be employed in a multi-slide. In the latter case, the take-up reel 74 may be eliminated, with the strip stock skeleton severed into small pieces of scrap material, and collected in a suitable container (not shown) located downstream of the sleeve forming station 112.

The nature of the succession of work stations and the work functions that they respectively perform on the strip stock 71 will now be described in greater detail with reference to both FIGS. 10 and 11. The strip stock 71 first passes through an oiling station 76 (FIG. 11) which may simply comprise a pair of oil receiving absorption pads (not shown) that coat both sides of the strip stock with a thin layer of oil. Such oiled surfaces substantially minimize wear of the various tooling employed thereafter to fabricate the inner sleeves 27. An oil drying station 77, preferably including a jet of heated air, or other suitable gas, is applied through a nozzle 78 (shown only symbolically in FIG. 10), to the side of the strip stock 71 to which an insulative film-forming liner will subsequently be secured. This leaves only a thin film residue of oil on the bonding side surface of the strip stock prior to the film being applied thereto, as will be subsequently described in greater detail. An alternative point in time for applying oil to the film bonding side of the strip stock will be described hereinbelow.

Figure 12:
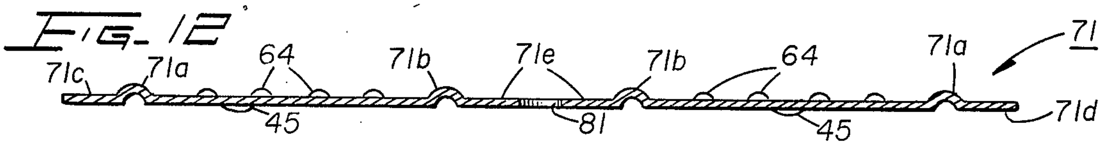
FIG. 12 is an enlarged, cross-sectional view of the sleeve-forming strip stock, taken along the line 12—12 of FIG. 11A, immediately after the embossing operation.

With particular reference now to FIGS. 10, 11A and 12, after leaving the oil drying station 77, the strip stock 71 is next advanced to a pilot hole and embossing station 79, whereat not only the aforementioned raised detents 64, but pilot holes 81 and longitudinally extending ridges 71*a*, *b* are formed in the strip stock. The ridges 71*a*, *b* ultimately form the raised ridges 38 and 39, respectively, of each fabricated and lined sleeve 27, as depicted in the composite connector 25 of FIGS. 2–4.

As illustrated in FIG. 11A, the strip stock 71 is processed so as to form dual row arrays of spaced sleeves along the longitudinal length thereof. It, of course, should be appreciated that the forming of the pilot holes 81, dimples 64 and ridges 71*a*, *b* in the strip stock may occur either simultaneously, or in rapid succession, depending on the construction of the particular apparatus employed for performing those work functions. The strip stock 71 as thus far fabricated is best seen in the enlarged, cross-sectional view of FIG. 12.

After advancing past the embossing station 79, as depicted in FIG. 10, the partially dried section of strip stock 71 passes through a perforating station 86 (FIG. 10), whereat the previously described array of perforations 42 is formed in each successively advanced planar configured sleeve region 87 (see FIG. 11B). The perforations 42, of course, define the sharp, inwardly extending protuberances 43 of the inner sleeve 27, best seen in FIGS. 7–9. An array of specially constructed punches (not shown) of conventional design are employed to effect the perforating operation, preferably from the oiled back side of the strip stock. In this connection, it should also be appreciated that the tooling required to form the array of detents 64 at the work station 79 could easily be incorporated in the tooling of station 86 so that the perforations 42 and detents 64 would all be performed either at one time or at least at one station, if desired.

In accordance with the principles of the present invention, the next work station, identified by the numeral 88 in FIG. 10, includes at least one guide roller 91 and a pressure roller assembly 92, both shown in greater detail in FIG. 11C, for applying an insulative film 95 from a supply reel 96 to the protuberance-formed side of the strip stock 71. It is the film 95, of course, that ultimately forms the unique insulative liner 60 described in detail hereinabove in connection with the preferred composite lined connector illustrated in FIGS. 2–4. As also previously mentioned, it is at this point during the fabrication of the lined sleeves 27 that oil may be applied indirectly to the front side of the strip stock 71, if not previously applied directly thereto, by simply spraying a layer of oil, such as through a spray nozzle 97, shown in phantom in FIG. 10, on the outer surface of the bonded film 95.

Figure 13:
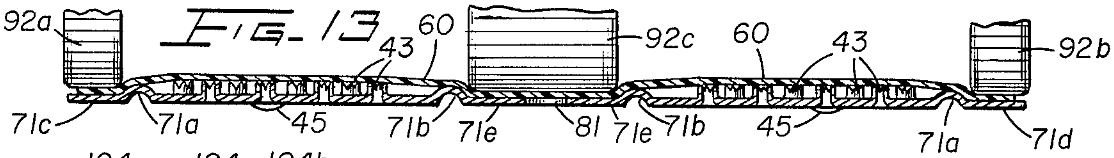
FIG. 13 is an enlarged, cross-sectional view, taken along the line 13—13 of FIG. 11C, of the sleeve-forming strip stock after the latter has been embossed, perforated and film-lined, and further illustrates the bonding rollers employed for securing the film to the partially fabricated strip stock.

As illustrated in cross-section in FIG. 13, the film 95 is actually pressure bonded to the strip stock 71 along only the longitudinally disposed planar border regions 71*c* and *d* and the central planar region 71*e*, by means of the spring-biased pressure rollers 92a-c. During such selective bonding, the film is also secured to the outer and upper wall portions of the raised ridges 71a and b associated with each row of partially fabricated sleeve. Securement of the film 95 across the entire width of the central planar region 71e is not necessary, however, as the major interior portion thereof is subsequently blanked in fabricating the dual line inner sleeves 27 (see FIGS. 11D, E). In practice, however, it is much simpler to utilize only one wide roller 92c than two narrow rollers adjacent each of the juxtaposed ridges 71a as viewed in FIG. 13. Regardless of the dimensions and number of rollers 92c employed, they are also effective in preventing the lined strip stock 71 from bowing while being fed through the apparatus in a vertically oriented plane.

With the bonding rollers 92a-c being laterally disposed and dimensioned as illustrated in FIG. 13, and adjustably biased as depicted in FIG. 11C so as to provide the proper bonding pressure, each resulting film-formed liner 60 is insured of being reliably secured to and near the opposite axial ends of each associated sleeve 27, as depicted in FIGS, 2, 3 and 9. This, in turn, importantly insures that the major central region of each liner is maintained taut in the axial direction of the sleeve, while overlying the distal ends of the sleeve protuberances 43 in the assembled connector.

For the bonding application of interest herein, the bonding rollers 92a-c may be made of either non-resilient or resilient material. As such, not only rigid steel or plastic rollers, but rollers with a resilient plastic or rubber periphery, have all been found to be effective in bonding the film 95 to the selected planar surface regions of the strip stock 71.

It should also be appreciated, of course, that the bonding rollers 92a-c may readily be formed with recessed or grooved peripheral surfaces so as to conform to approximately the outer half of each of the previously embossed ridges 71a and b selectively associated therewith. With the bonding rollers so formed, the film 95 could be more effectively pressure-bonded to the raised ridges as well as to the adjacent planar sections of the embossed strip stock 71.

It should be appreciated, however, that by forming at least the periphery of the bonding rollers 92a-c out of a resilient material, such as rubber, they may adequately conform to both the planar and ridge-formed areas of the strip stock while still having a normally flat peripheral surface. It has been found, however, that the insulative film 95 may be reliably secured to the ultimate circumferentially disposed, planar end regions 27a and b of the inner sleeves 27 (see FIG. 2) by simply dimensioning the width of the bonding rollers 92a-c so as to actually only contact the longitudinally disposed planar surface regions 71c-e that are immediately adjacent the raised ridges 71a, b, as illustrated in FIG. 13.

As previously mentioned, it nevertheless is advantageous to have the bonding rollers adjustably biased in some suitable manner so as to optimize the adherence of any given film (with or without an adhesive layer, and with or without the application of heat) to the strip stock 71. In this connection, it should be understood that the bonding rollers may not only be constructed to incorporate internal heating elements, but may also be coupled to an untrasonic transducer to effect ultrasonic bonding if desired. The use of heat and/or ultransonic energy in conjunction with pressure will depend, of course, on the nature of the strip and film stock employed in a given application.

After leaving the film application station 88, as depicted in FIGS. 10, 11C and 13, the film-lined strip stock 71 is advanced through a sleeve blanking station 98. At this station conventional tooling (not shown) is provided to initially blank out the individual inner sleeve regions 87, identified in FIG. 11B, into what may best be described as lined I-beam planar sections 87', depicted in FIG. 11D. These I-beam sleeve sections are integrally connected to the remaining strip stock by only narrow unblanked ribs 99, and are separated from each other in each row by blanked-out areas 101, so as to form a strip stock skeleton.

An optional pilot hole operation may be performed at or in either side of the I-beam blanking station 98. More specifically, it has been found that once the film 95 has been bonded to the strip stock 71, the minute areas of film that then cover the previously formed pilot holes 81 have a tendency, when adhesive-backed film is employed, to build-up on the first pilot pins that perforate the bonded film. Such pilot pins are used throughout the progressive punch and die apparatus, of course, for strip stock alignment and/or feeding.

To overcome the film build-up problem, it has been found advantageous in certain lined sleeve-forming application to utilize a new set of pilot pins after the film has been applied to the strip stock. The first pins of this new set are used to perforate new pilot holes 81', shown in phantom in FIGS. 11D, 11E, between the original pilot holes 81. Such new pilot holes thus extend not only through the film, but through the underlying strip stock. In this manner, the minute area of film that encompasses each new pilot hole that is perforated remains secured to the underlying area of strip stock when both are blanked out. As such, there is no build-up of minute pieces of film on the first pilot pins of the new set thereof that perforate the film 95. This problem of film build-up could also be eliminated, for example, by heating those pilot pins that first perforate the bonded film in the sleeve-forming apparatus.

Figure 14:
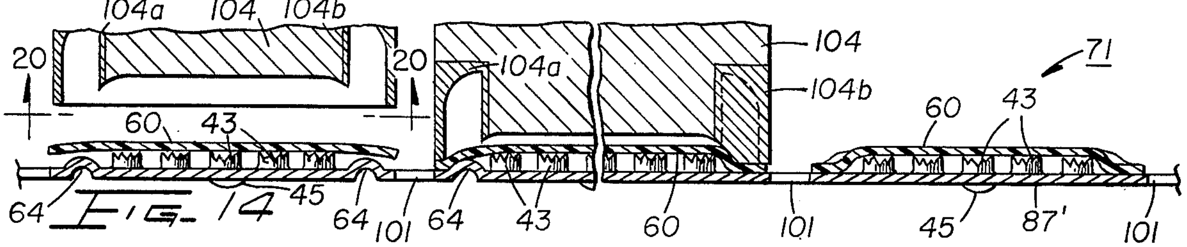
FIG. 14 is an enlarged, cross-sectional view taken along the line 14—14 of FIG. 11D, illustrating the border edges of the I-beam shaped sleeve sections incorporating detents therein (best seen in FIG. 9), and further illustrating a bonding die with detent accommodating recesses for pressure-bonding edges of an overlying liner to the mating sleeve section borders encompassing the detents.
Figure 20:
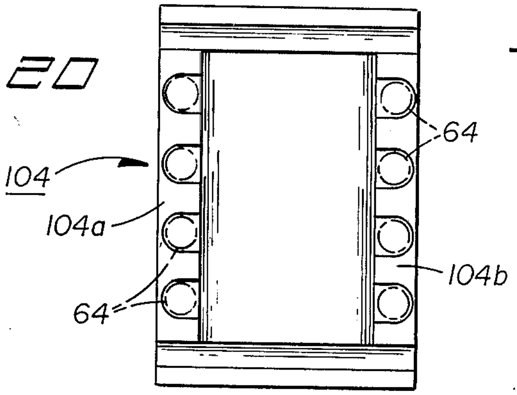
FIG. 20 is a detail plan view, taken along the line 20—20 of FIG. 14, of the underside of the bonding die depicted in FIG. 14.

Another optional operation, which involves bonding dies either associated with the blanking dies (not shown) at station 98, or located at a separate station downstream thereof, is illustrated in FIGS. 14 and 20. More specifically, each bonding die 104 is preferably constructed with two narrow and mutually disposed integral ridges, or resilient border inserts 104a, as shown, and a row of spaced recessed 104b (best seen in FIG. 20) spaced along and extending inwardly of each insert, being exposed on the underside thereof. Each such die 104 allows the pressure bonding of each blanked out liner 60 to the associated partially blanked out sleeve section 87' along the border regions 87'a and b of the latter, as depicted in FIG. 11B.

The recesses 104b in each die 104, as depicted in FIG. 20, are dimensioned and spaced so as to respectively accommodate the detents 64 that are formed in rows along the sleeve section border regions 87'a, b. By way of further clarification, the border region 87'a in strip stock form, for example, is the same as the border region 27d in the partially broken away and folded-open pictorial view of a completely fabricated liner inner sleeve 27 depicted in FIG. 9. It is understood, of course, that the dies or inserts 104a could be made of sufficiently resilient material, such as rubber or certain plastics, so as to obviate the need for the recesses 104b, which are primarily intended for use with non-resilient dies and/or inserts to prevent the flattening or deforming of the detents 64.

Regardless how the bonding dies 104 are constructed, the purpose thereof is primarily to insure that the mutually disposed and longitudinally extending edges of the liner 60, as ultimately positioned in the fabricated sleeve 27, will be firmly secured to the mating longitudinal edges of the latter. This is particularly important in not only preventing the exposure of any wrinkled or bulging liner edges to conductors when inserted therewithin, but in insuring that a smooth and uniform air gap 102 (see FIGS. 5, 6) exists between the longitudinally extending sleeve edges.

In connection with the defined air gap 102, it is appreciated, of course, that the two rows of detents 64, in best seen in FIG. 9, will cause the overlying edges of the liner to become slightly withdrawn or insert from the adjacent edges of the sleeve 27 after the bonding die 104 has been applied thereagainst. This slight liner edge inset (not shown), which typically may be in a range of 0.0002 inch to 0.005 inch advantageously results in only the smooth longitudinally extending edges of the inner sleeve 27 actually being exposed at and, thereby, defining the air gap 102. As such, the lined inner sleeve are much more conductive to either gravity or forced feed along a narrow blade-like rack 105, for example, from a vibratory bowl 106 to a work station 107, all generally depicted in FIG. 23. At station 107, the sleeves are successively aligned with, and inserted within, mating outer sleeves 29. The latter are mounted, for example, in a suitable magazine 108, and successsively driven into coaxially disposed relationship with the respectively aligned inner sleeves 27, for example, by a ram driving pneumatic cylinder **109*a*, that operates in conjunction with a stop plate-operating pneumatic cylinder 109*b*.** This assembly operation, of course, may be readily accomplished in an automated manner with any one of a number of other types of conventional apparatus.

Figure 15:
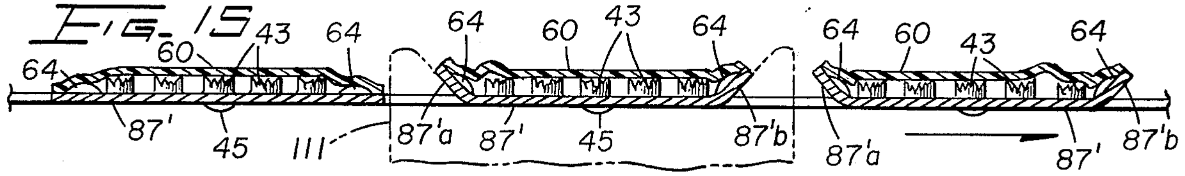
FIG. 15 is an enlarged, cross-sectional view taken along the line 15—15 of FIG. 11E, illustrating in greater detail how bent-up "ears" are formed along two opposite edges of each sleeve section.
Figure 11F:
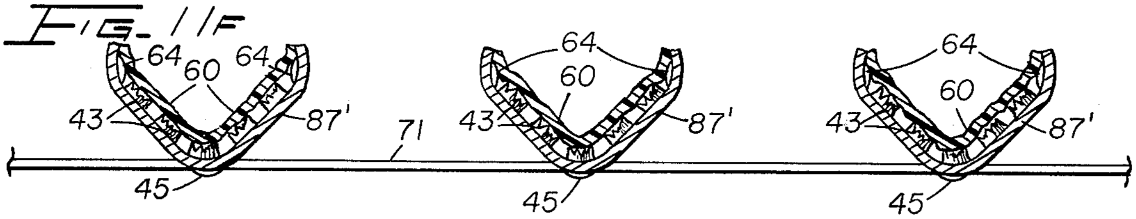
Figure 11G:
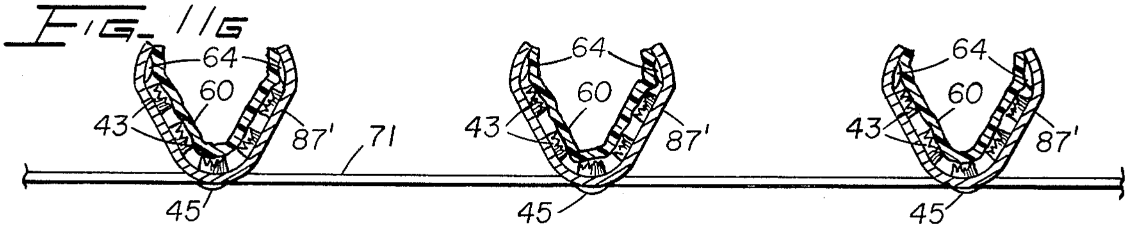
Figure 11H:
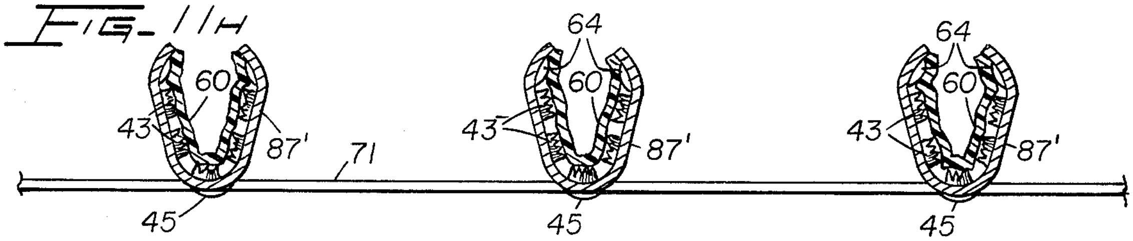
Figure 11I:
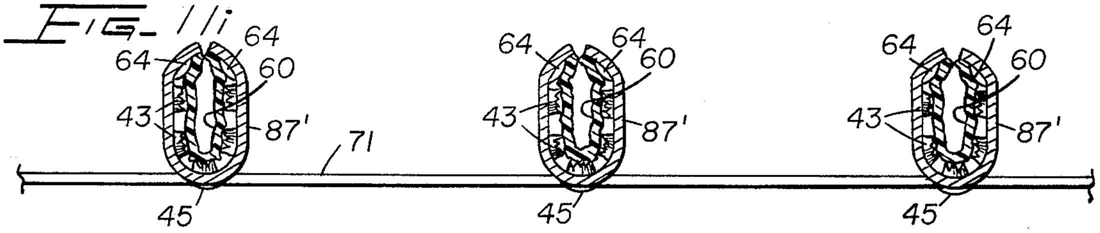

After leaving the blanking station 98 (FIGS. 10 and 11D) the almost completely fabricated strip stock 71 is advanced to a so-called "ear" forming station 110. At this station conventional dies, such as the one identified by numeral 111, and pictorially depicted in phantom view in FIG. 15, are employed to bend the two narrow border regions **87'*a* and 87'*b* of each sleeve section 87' upwardly at an angle of approximately 45°. As previously mentioned, these border regions respectively encompass the mutually disposed rows of detents 64 of the fabricated sleeve, best seen in FIG. 9. This ear forming operation facilitates the final forming of each sleeve section 87'** into the desired configuration.

The penultimate work function performed on the strip stock 71 involves a progressive series of die forming operations whick take place at the work station identified by the reference numeral 112 in FIG. 10, with the work functions performed thereat being depicted in FIGS. 11F-11I. As readily seen in the latter series of figures, it is at this stage of fabrication that each of the previously blanked out planar sleeve sections 87' is progressively formed into its elliptical (or any other desired) cross-section, as viewed in FIG. 11I.

Figure 11D:
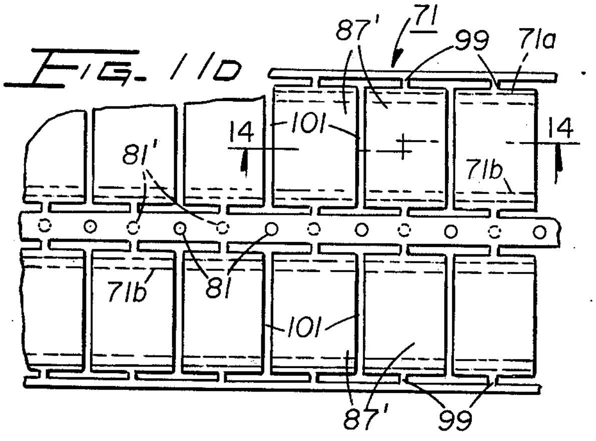
Figure 11E:
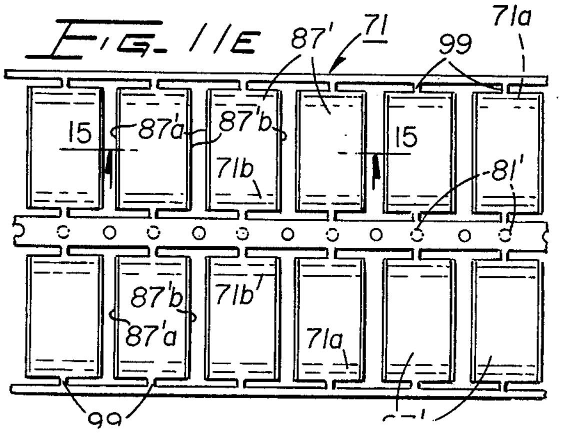

After the final sleeve forming work function has been completed, utilizing conventional dies (not shown in the interest of clarity), the completely formed sleeve sections 87' are then severed as completely fabricated lined sleeves 27 (FIGS. 2, 3 and 9) from the narrow supporting ribs 99 of the strip stock 71 (see FIGS. 11D, E). This operation results in only a substantially completely blanked-out strip stock skeleton remaining as scrap material which may then be either cut-up into small pieces or wound upon the take-up reel 74, as illustrated.

From the above described method of fabricating the lined inner sleeves 27, it is readily appreciated that the unique liner 60 has the advantage of being reliably secured only to selected non-perforated mating surface areas of the inner sleeve 27 in a manner that is completely automated, and in no way impairs the fabrication rate of the metallic inner sleeves per se. In regard to the latter, it has been found that when a multi-side has been employed to fabricate the sleeves heretofore, the majority of the work station dies therein may in many cases simply to re-arranged so as to perform the work functions in the unique, alternative sequences described herein. What is required, of course, is that suitable space be allowed to accommodate the relatively simple and inexpensive insulative film bonding apparatus. As has already become very evident, however, a minimal amount of additional space is required for that unique purpose.

The present method also reliably results in the liner being consistently positioned in overlying relationship with respect to the distal ends of all of the protuberances 43, and maintained taut in the important axial direction of the sleeve. Equally important is the fact that a minimum amount of liner material is required for each sleeve. The actual amount of linear material required is dependent, of course, on the cross-sectional area encompassed by the protuberances 43 in any given inner sleeve design.

From the foregoing, it is readily appreciated that the costs of not only the present liner, but the assembly thereof within the inner sleeve are substantially minimized and, hence, the total cost of the composite connector is materially reduced.

As previously mentioned, after the fabrication of each composite lined sleeve 27, often referred to as a B-wire connector insert, it is thereafter telescopically inserted within a different aligned outer sleeve 29. Force-fit engagement of the inner sleeve within the outer sleeve is generally facilitated by one or more of the previously identified outwardly extending detents 45 (FIG. 11B). Each such coaxially assembled unit is then mounted within the insulative outer jacket 36. This jacket is generally initially inserted over the outer sleeve 29 while in the form of a short, predetermined length of heat shrinkable plastic tubing 36', depicted in FIG. 23, such as of polyolefin resin. This operation is normally performed after an array of composite sleeve assemblies have been fed along a suitable trough 113, for example, into respective vertical alignment with a succession of indexably advanced support pins **114*a* mounted in a row on a suitable rack 114, indexably transported on a suitable carrier 115. Each section of tubing 36' may be inserted over a different aligned pair of pin-mounted sleeves, for example, from a suitable tube supporting magazine 116, with the successive feeding of the tubes being controlled by a stopplate coupled pneumatic cylinder 117.**

The dimensions of the support pins **114*a* and the base area of the rack adjacent the lower end of each pin are chosen and contoured so as to result in the sections of plastic tubing 36', when subjected to a predetermined degree of either uniform or gradient controlled heat in an oven 118, for example, shrinking the tubing 36'** into the jacket 36 having the desired substantially pinched-off end 36*b* and the necked-down region 36*c* depicted in FIGS. 2–4. Further details in regard to the conventional apparatus and techniques employed for the inserting the inner sleeves coaxially within the outer sleeve, and for encapsulating the latter within the jacket, are not demand necessary to an understanding of how the unique liners embodied herein are assembled in the inner sleeves 27 of B-wire type connectors in accordance with the principles of the present invention.

Figure 18:
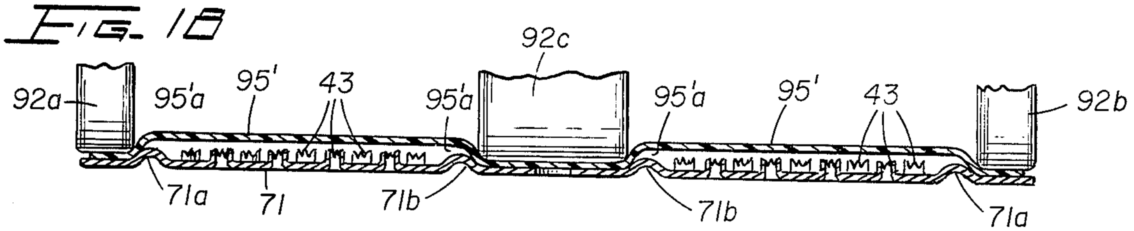
FIG. 18 is an enlarged, cross-sectional view taken along the line 18—18 of FIG. 17C, of the strip stock and bubble-formed, film-defining liner secured thereto after the perforating operation.
Figure 19:
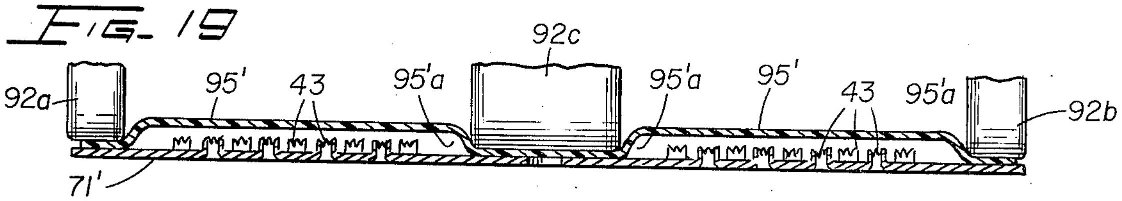
FIG. 19 is a cross-sectional view similar to that of FIG. 18, but illustrating that ridges need not be formed in the strip stock to function as spacers, if not otherwise required for sleeve rigidity.

The manner of assembling liners 60 described hereinabove, with particular reference to FIGS. 10 and 11, constitutes only one of several preferred methods for that purpose. For example, and with reference to FIGS. 17 and 18, an alternative liner assembly process is disclosed wherein a strip stock 71 is initially processed at the first two work stations 17A and B in the same manner as illustrated in FIGS. 11A and B, respectively. Thereafter, however, a film 95°, initially formed with a plurality of bubble (or dimple) areas 95′*a* (best seen in FIG. 17C), is bonded (or otherwise secured) to the strip stock 71, preferably as depicted in FIG. 17C. The bubbles 95′*a* are dimensioned and spaced so as to allow the respective arrays of inner sleeve-formed protuberances 43 to be confined respectively within the raised bubbles. To this end, and as best seen in FIGS. 18 and 19, each bubble 95′*a* is preferably dimensioned so as to form a recessed area having a depth at least slightly greater than the outwardly extending height of each protuberance 43. In this manner, when the film 95′ is secured to the strip stock 71, the possibility of the protuberances 43 accidentally piercing the overlying wall area of a given bubble will be greatly minimized, if not completely eliminated. In this connection, it is seen that the raised ridges 71*a*, *b* depicted in FIG. 18 are not needed as spacers, but may still be desired to increase the rigidity of the fabricated sleeve. FIG. 19 depicts a section of fabricated strip stock 71′ with the ridges eliminated. In the interest of clarity, it should be noted that like reference numerals are used wherever possible in the various drawings to denote identical structural elements.

With the bubbles 95′*a* defining recessed cavities with the aforementioned dimensions, it is readily appreciated that the array of protuberances 43 associated with each sleeve-defining planar section 87′ of the strip stock 71 may advantageously be perforated after, as well as before the film-defining liner has been selectively secured to the strip stock 71. A possible advantage of this reversed sequence is that the strip stock is much more rigid during the bonding operation if the perforations are not yet formed therein.

Another advantage realized from utilizing the film 95′ with pre-formed bubbles is that regardless whether it is applied before or after the perforating operation, no adhesive need be applied to, or come in contact with, the recessed upper wall surface of each bubble.

Figure 21:
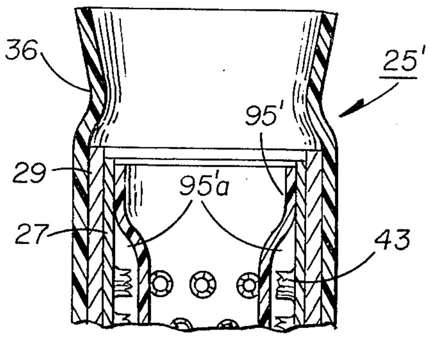
FIG. 21 is an enlarged, cross-sectional view of a lined connector incorporating a bubble-formed film-defined liner in accordance with the principles of the present invention.

Considered more specifically, the bubble-formed film 95′ readily lends itself to being selectively coated with a suitable adhesive in only selected patterned surface areas that will actually be in mating, planar contact with the strip stock 71. Alternatively, the strip stock 71, as depicted in FIG. 16, may be initially coated with a thin layer of adhesive on only the longitudinally disposed planar regions 71*c-e* in which the strip stock and film 95′ would subsequently be brought into bonding engagement. In either case, the resulting liner 60′ depicted in a connector 25′ of FIG. 21 would always be assured of being reliably secured to the mating axially disposed end regions of each sleeve 27.

As such, during the crimping of an assembled lined connector incorporating a liner 60′, the protuberances 43 in piercing the liner would not contact any adhesive material. This has the advantageous of obviating any possible increase in resistance that could otherwise occur by reason of the particular composition of a given adhesive coating. As previously mentioned, however such a possible resistance increase has normally been found to be extremely low for most of the commercially available and applicable adhesives and, thus, would generally be of no consequence for most circuit connection applications.

Should it be desired that the border edges of each blanked-out I-beam planar sleeve section 87′*a*, *b* (see FIG. 11D) also be pressure bonded to the strip stock, the adhesive, if initially applied thereto, would then have to be laid down in the form of a series of rectangular patterns that would correspond to the peripheral planar border regions of each bubble 95′*a* formed in the film 95′. A die similar to 104 depicted in FIGS. 14 and 20, but without the recesses 104*b* (as no detents 64 would be required as spacers) could be used for the purpose in question. The bubble-formed film 96, of course, may also be made out of a suitable ionomer resin so that no adhesive coating need be applied to either the film stock or the strip stock 71.

Regardless at what point in time the bubble-formed film 95′ is applied to the strip stock 71, after the perforating and blanking operations corresponding to the operations previously depicted in FIGS. 11A and 11B have been completed, the then film-lined strip stock 71 is normally further processed to the completion of finally fabricated liner inner sleeves 27′ according to the same sequence of forming operations previously described and depicted in FIGS. 11D-I. The resulting fully fabricated sleeves with bubble-formed liners 60′ are thereafter respectively inserted within outer sleeves 29, with each of the latter than encapsulated within an insulative jacket 36 so as to form the composite lined electrical connector 25′ of FIG. 21, which embodies the same basis features as incorporated in the connector 25 depicted in FIGS. 2–4.

FIG. 22, comprised of views 22A-F, illustrates still one additional preferred method for securing discrete liners respectively to sleeve-defining strip stock sections so as to overlie the protuberances formed therein. By utilizing discrete liners, blanked out of film stock essentially in the form of "postage stamps", the amount of linear material required for a given connector may be reduced oven further than is realized with the linear assembly methods involving simultaneous film and strip stock I-beam blanking described above. This is paticularly the case when the inner sleeve surface area is considerably larger than the central surface area required to form a given number of protuberances for a particular connector and application therefor.

Figure 22A:
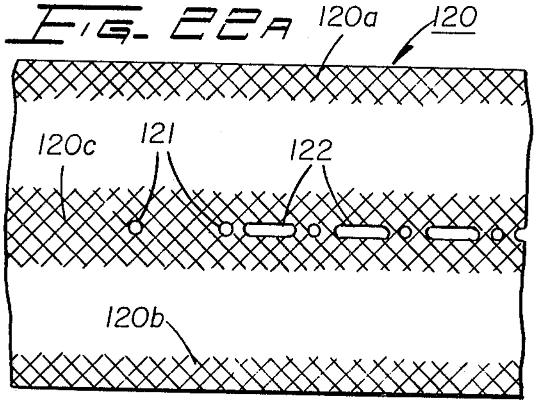
FIG. 22, comprised of FIGS. 22A-F, illustrates still another unique sequence of operating steps involved in an additional alternative preferred method of fabricating the inner sleeve of B-wire type connectors out of strip stock, while sequentially with such steps securing a discrete film-defining liner to the inner sleeve in a manner that embodies the principles of the present invention.
Figure 22B:
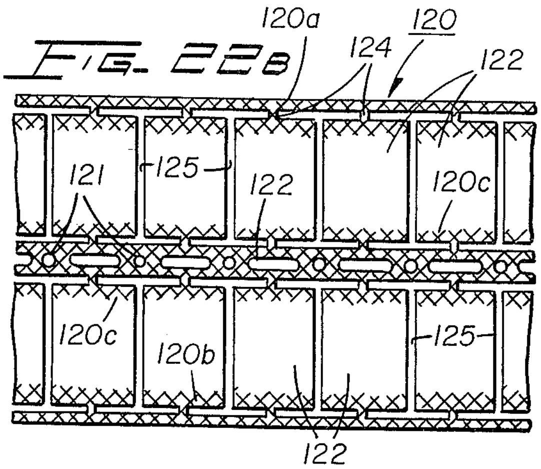

Starting with FIG. 22A, it is seen that a section of strip stock 120 is initially formed with pilot holes 121 interposed between blanked-out rectangular openings 122, both being longitudinally spaced in alternate fashion along the central region of the strip stock. The rectangular openings 122 are primarily empolyed to allow the strip stock to slightly expand and contract in lateral width during certain of the subsequent processing operations that follow in a sequence different from those described in the previous liner assembly processes.

More specifically, after the pilot holes 121 and rectangular openings 122 have been formed, the strip stock 120 is advanced to an I-beam blanking section, incorporating tooling essentially identical to that described for station 98 of FIG. 10, whereat a dual line array of planar sleeve sections 123 (see FIG. 22B) are formed in the strip stock. After this blanking operation, the sleeve sections are supported by only narrow integral ribs 124, and are separated from each other in each row by blanked-out spaces 125.

Figure 22C:
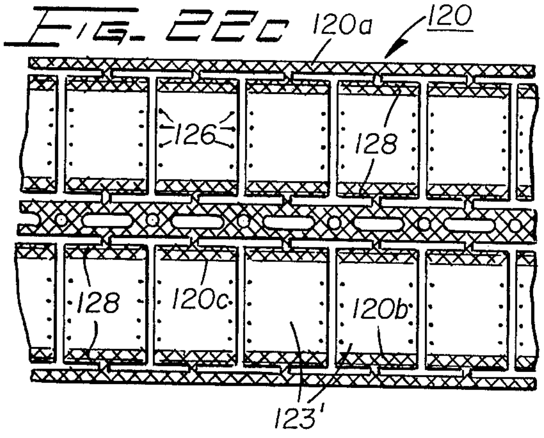
Figure 22D:
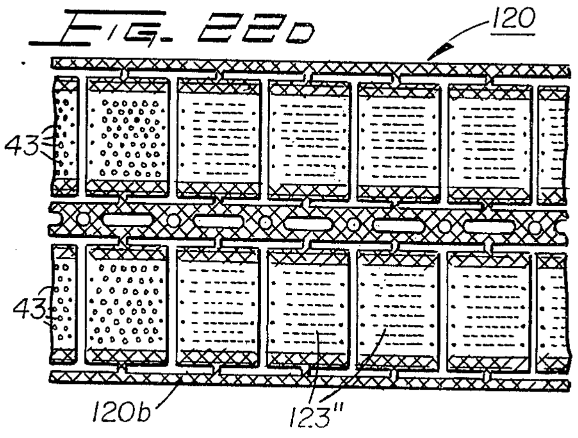

The strip stock 120 is next advanced to an embossing station, similar to station 79 of FIG. 10, whereat a plurality of detents 126 and raised ridges 128 (respectively essentially identical to the detents 64 and raised ridges 71a and b of FIG. 9) are formed either simultaneously or successively in the strip stock so as to form the further fabricated sleeve sections 123', as illustrated in FIG. 22C. Thereafter, as depicted in FIG. 22D, each of the planar sleeve sections 123 is perforated so as to form a sleeve section 123'' with an array of protuberances 43 essentially identical to those previously described and identified by the same reference numeral in connection with FIGS. 2, 3, 9 and 11D, in particular. One exception, of course, is the series of rectangular openings 122. As previously mentioned, the latter have been found to compensate for the lateral expansion and contraction of the strip stock that is more pronounced when the protuberances 43 are formed therein following the blanking of the I-beam sleeve sections. Once the latter have been formed, it is appreciated that the resulting strip stock skeleton is much less rigid than before such operation.

Distinguishing more significantly from the previously described liner assembly methods, however, is the manner in which each liner 60'' is secured to each perforated I-beam sleeve section 123''. With particular reference to FIG. 22E, it is seen that a section of roll stock film 131 is advanced longitudinally in overlying relationship with the strip stock 120, at least while passing through a film blanking work station identified generally by the reference numeral 135.

As the film 131 is incrementally or continuously advanced along a path between supply and take-up spools, such as 73 and 74 depicted in FIG. 10, discrete liners 60'' are blanked out of the film by a pair of juxtaposed die assemblies 138 (one for each row of sleeves) each time a pair of I-beam sleeve sections 123'' are brought into alignment with the die assemblies. Each such die assembly preferably includes a reciprocally operated male die section 139 and a stationary female die section 141. The die section 139 is preferably formed with a plurality of central bores 142 which communicate with the underside thereof, in the form of a spaced array of orifices 143, and merge into a common outlet port 144 that is, in turn, coupled to a vacuum line 146. Such vacuum coupled orifices allow the die section 139 to hole each blanked-out liner 60'' reliably, and with precise orientation, as the die section subsequently transfers the liner 60'' to an aligned sleeve section 123''. The underside of the die section 139 is also contoured with a recessed area 147, and with outer raised ridges 148. This die construction advantageously not only facilitates the film blanking operation, but simultaneously allows the peripheral edges of the blanked-out liner 60'' to be pressure-bonded immediately thereafter to the mating planar regions that surround the array of protuberances 43 formed in the aligned sleeve section 123''. The central recessed area 147, in conjunction with the spaced array of vacuum-drawing orifices 141, also insures that the major central area of each liner 60'' overlies the distal ends of the protuberances 43 with sufficient clearance so as to prevent the protuberances from prematurely perforating the liner.

It is appreciated, of course, that the film stock 131 could be formed with bubbles as depicted in FIG. 17C. In that case, the vacuum bores 142 and orifices 143 in the die section 139 would be optional, and if used, only to facilitate the transfer of the liner 60'' to the aligned sleeve section 123''.

In connection with the construction of the reciprocally operated die section 139, it may be desirable in certain applications to form it out of resilient material, or to construct it with resilient inserts in the outer raised peripheral surface regions 148 thereof. As such, the die section 139 may be utilized to more effectively bond not only the outer planar border regions adjacent the raised ridges 128*a* and *b* of each sleeve section 123'', but those regions that also include the detents 126 depicted in FIGS. 22C, D (corresponding to detents 64 in FIG. 9). In this regard, the die section 139 would perform essentially the same pressure bonding functions as the bonding die 104 described earlier in connection with FIGS. 14 and 20.

When an adhesive is used to effect the bonding of the liner 60'' to the mating sleeve section 123'', the adhesive may either be applied to the film stock 131 or to the strip stock 120, and preferably in a striped (or repetitive rectangular) pattern. One such striped pattern of adhesive deposited on the strip stock 120 is represented by the longitudinally extending cross-hatched regions 120*a*, *b* and *c* shown only in FIGS. 22A and B for purposes of illustration. Such striping could be applied to the strip stock at any time prior to the film blanking operation depicted in FIG. 22E.

The liner blanking and transferring operations in accordance with the one preferred illustrative method are best seen by examining the three stages of die movement in FIG. 22E. More particularly, as seen in the leftmost view, the die section 139 is initially fully retracted, with an unblanked section of film stock 131 disposed therebeneath, and an I-beam sleeve section 123'' having been brought into alignment with die sections 139 and 141. At this point in time, the reciprocally operated die section 139 is rapidly advanced into engagement with the aligned sleeve section 123'' as depicted in the center view of FIG. 22E. During this advancement, the closely machined spacing between the peripheral edges of the die sections 139 and 141 effect the blanking out of a discrete liner 60''. With the vacuum line 146 coupled to the die section 139, the discrete, blanked-out liner 60'' is thereafter maintained firmly against the recessed underside of that die section until the liner is pressure-bonded to the mating area of the sleeve section. Thereafter, the die section 139 is retracted from the film-lined sleeve section 123'', as depicted in the rightmost view of FIG. 22E, with vacuum normally being cut off at this time.

It is appreciated, of course, that the die section 139 could be heated, if desired, for use in connection with bonding either adhesive-backed or heat-sensitive ionomer film-defining liners 60'' to the sleeve sections 123''.

From the foregoing, it should also be understood that the individual blanked-out liners 60" may be severed from the film stock in any one of a number of different ways, which may comprise separate apparatus for the blanking operation and the transferring operation, if desired. Conversely, instead of a reciprocally operated die assembly 139 of the type illustrated, each liner 60" could be blanked out of the film stock 131 and transferred from the blanking station to the bonding station by a rotating wheel, for example, wherein the peripheral surface thereof could function as the back plate of a die blanking assembly, and with vacuum orifices built into the wheel so as to retain the blanked-out liner 60" in a desired position as the wheel rotates through a predetermined arc, such as 180°, at which point the liner would be aligned with a given planar sleeve section 123". Either the transfer wheel or the sleeve-forming strip stock 120 could then be moved laterally at that point so as to effect the bonding of the liner to the sleeve section. To this end, it should be understood that the sequence of operations depicted in FIG. 22 are only intended to illustrate one preferred process for effecting the assembly of discrete liners 60" within the inner sleeves 27 in an efficient, reliable and relatively high speed, as well as automated manner.

After the securement of the discrete, blanked-out liners 60" to the planar sleeve sections 123", the composite lined sleeve sections, as indicated in FIG. 22F, are then formed into the desired elliptical shape in the same manner as depicted in FIGS. 11F-I. Thereafter, the inner sleeves may be readily inserted within respective outer sleeves 29, and the assembled sleeves then encapsulated within jackets 36 as described hereinabove in connection with connector 25 of FIGS. 2–4.

In addition to the assembly of discrete liners 60" to the respectively blanked-out and perforated sleeve sections 123" illustrated in FIG. 22, if should be understood, of course, that a continuous film 131 in roll stock form could also be applied to the strip stock 120 after the perforating operation depicted in FIG. 22D. In that case, a separate blanking operation would then be required to blank out the secured film into planar sleeve-lined sections then corresponding to those identified by the numeral 87' in FIG. 11D. Should the roll stock film be formed with appropriately dimensioned and spaced bubbles (or dimples), such as illustrated in FIG. 17C, then the film bonding operation, as previously noted, could take place at any time, down through the perforating operation depicted in FIG. 22D, but preferably following the forming of the pilot holes 121 and rectangular openings 122, depicted in FIG. 22A.

It should also be appreciated that hollow, open-ended pre-formed liners could also be employed for the purpose described and of concern herein, albeit in more limited applications, and normally with less satisfactory results and fewer advantages. Such pre-formed liners may take the form of completely closed wall tubing, similar to the jacket tubing 36' of FIG. 23, or have a longitudinally extending slot formed therein and positioned so as to essentially correspond to the air gap 102 of the liner 60 and inner sleeve 27 depicted in FIGS. 5 and 6. To that extent, a pre-formed liner may be envisioned as either tubular, band or ring shaped in cross section. It could be dimensioned to extend along substantially the entire length of the assembled connector bore or, alternatively, be coextensive with the inner sleeve, at least to the extent of completely overlying the array of protuberances formed therein. In any event, such a pre-formed liner may be made out of any one of a number of the aforementioned plastic resins, and be inserted telescopically within the inner sleeve 27, for example, with apparatus of the type depicted at the sleeve insertion station 107 of FIG. 23.

It is appreciated, of course, that such pre-formed liners would normally require considerably more thickness than the film-applied type described in the various preferred embodiments hereinabove. This could, in turn, adversely affect the perforability of the liner. Moreover, the effective bore diameter of a given connector would normally be much more restricted with pre-formed insertable liners. In addition, the peripheral edge of such a liner nearest the open end of the connector would normally be exposed to the free ends of conductors when inserted therewithin, unless the necked-down region 36c of the outer jacket 36 was specially contoured so as to completely shield such an otherwise exposed liner edge. It is also obvious that pre-formed tubular, ring or band shaped liners would normally not lend themselves to the high speed, automated type of assembly realized with the film-formed liner embodiments described hereinabove.

In summary, several unique B-wire lined connectors and several preferred methods of assembling the liners within the inner sleeves thereof have been disclosed and are claimed herein. The manner in which the film-formed liner in particular is positioned within and secured to the inner sleeve of each connector in conducive to high volume, automated assembly at low cost, and insures that the liner remains taut in its axial direction within the sleeve at all times, so as to itself present no obstruction within the central bore of the connector. As assembled, the liners embodied herein also require a minimal amount of material, as they need be only slightly larger than the area encompassed by the array of inner sleeve protuberances.

In view of the foregoing, it is obvious that various modifications may be made to the present illustrative embodiments and methods of the invention, and that a number of alternatives may be provided without departing from the spirit and scope of the invention. For example, in certain circuit applications it may be possible to utilize a single metallic sleeve of malleable material, formed with inwardly extending barbs, and lined in accordance with the principles of the present invention. The use of a single versus two coaxially disposed metallic sleeves would depend, of course, on a number of factors, such as the size of the connector, the composition and gauge of the sleeve-forming strip stock material, and the composition and thickness of the conductor insulation.

What is claimed is:

1. In a method of assembling electrical connectors of the deformable type, wherein at least one metallic sleeve is formed with a spaced array of inwardly projecting insulation-piercing tangs, and wherein an insulative, open-ended jacket surrounds said sleeve, the improvement comprising the step of:

positioning a perforable insulative liner adjacent said sleeve so as to overlie the distal ends of said tangs, and extend continuously in both the circumferential and longitudinal directions as a single-wall liner, with no overlapped regions in said sleeve, and with no discontinuities at least to the borders of the array of tangs formed in said sleeve.

2. In a method of assembling electrical connectors of the deformable type, wherein at least one metallic sleeve is confined within an insulative, open-ended jacket, and wherein at least said one sleeve is initially formed as a spaced series of respective planar sleeve sections in an advancing supply of strip stock, with each sleeve section having a continuous border and including a plurality of insulation-piercing tangs formed within the border and in an array on one side thereof so as to extend inwardly after the sleeve section has been formed into the desired sleeve configuration and severed from the strip stock, the improvement comprising the step of:

positioning a thin, perforable insulative film on and in overlying coextensive relationship with at least each successively spaced sleeve section formed in the strip stock, and securing at least preselected areas of said film that overlie said sleeve section border to the latter, with pressure, so as to form an insulative liner therefor, each such liner thus overlying the distal ends of the array of tangs whenever formed in the associated sleeve section, and being confined on only one side of and within the periphery of the sleeve section.

3. In a method of assembling electrical connectors of the deformable type, wherein an inner sleeve is telescopically coaxially positioned within an outer metallic sleeve, with the assembled sleeves thereafter confined within an outer, insulative jacket, and wherein the inner sleeve is formed with a spaced array of inwardly projecting insulation-piercing tangs, said method including the step of:

positioning a thin, perforable insulative film adjacent to and in overlying, continuously coextensive relationship with said tangs so as to form a circumferentially disposed, single-wall liner, with no overlapped regions within said inner sleeve of the assembled connector, and with no discontinuities at least in the area adjacent to and coextensive with said array of tangs.

4. A method of making electrical connectors of the deformable, conductor-insulation-piercing type having at least coaxially telescopically disposed first and second sleeves confined within an outer, insulative jacket, said method comprising the steps of:

forming a plurality of sharp, outwardly extending insulation-piercing protuberances in an array on one side of and in each of a succession of spaced regions along an indexably advanced supply of metallic strip stock, each array of protuberances encompassing at least a substantial central portion of each associated region;

positioning a thin, perforable insulative film on and in overlying coextensive relationship with at least each successively spaced region of protuberances formed in said strip stock, and securing at least preselected areas of said film to mating areas of the strip stock in each of said protuberance-defined regions so as to form an insulative liner overlying the distal ends of said protuberances;

progressively blanking out said strip stock into a skeleton pattern of interconnected and longitudinally extended inner sleeve-defining planar sections interconnected by unblanked portions of said strip stock;

forming each of said inner planar sleeve sections into at least a substantially hollow sleeve, with said film-defining liner secured to the inner surface thereof, and while still integrally supported by unblanked portions of said strip stock;

severing each formed first sleeve and associated liner from the remaining interconnecting portions of said strip stock;

inserting each first sleeve and associated liner as a composite insert within an associated second, outer sleeve made of a malleable and, thereby, readily deformable material, and applying an insulative plastic jacket about said second outer sleeve in form-fitting relationship therewith, and leaving at least one end of said second sleeve open so that conductors may be readily inserted into the bore of said lined first sleeve of the assembled connector.

5. A method in accordance with claim 4 wherein said insulative film is positioned as a discrete liner in overlying relationship with an associated array of protuberances after the blanking of said strip stock.

6. A method in accordance with claim 4 wherein said insulative film is secured in roll stock form to said strip stock after the blanking thereof, and further including the step of blanking out said longitudinally extending secured film so as to form discrete liners that are each coextensive with a different previously formed planar sleeve section.

7. A method in accordance with claim 4 wherein said insulative film is initially in roll stock form and is positioned substantially coextensively on and secured at least at selected regions to one side of said strip stock while advanced with the latter.

8. A method in accordance with claim 7 wherein said insulative liner comprises a thin polymeric film having an adhesive backing on at least selected portions of one side thereof, with said adhesive portions being bonded to mating surface areas of the underlying sleeve region, and wherein said insulative jacket is formed by positioning a heat-shrinkable plastic tubing about each second, outer sleeve, and extending a predetermined distance beyond both ends thereof, and thereafter applying heat to said tubing so as to shrink said jacket to a substantially reduced diameter at one end region, while simultaneously controlling the shape of said jacket during the application of heat thereto at the other end so as to form a necked-down region that merges into a flared-out terminating end portion, said flared-out region facilitating the insertion of conductors within said connector, and said necked-down portion providing an inwardly tapered, circumferentially disposed receding shoulder that at least partially shields the upper peripheral edges of said liner and first and second sleeves adjacent thereto from contact with conductors while being inserted into said connector.

9. A method in accordance with claim 7 wherein said insulative liner comprises a polymeric heat-sensitive film with at least predetermined areas thereof being directly bonded to mating, inner surface areas of said planar sleeve section in response to at least heat being applied to said film in the areas where bonding is desired.

10. A method in accordance with claim 7 further comprising the step of:

applying adhesive to one side of said strip stock in accordance with a predetermined pattern prior to said insulative film being positioned on and secured to said strip stock along said adhesive pattern.

11. A method in accordance with claim 7 wherein said sleeve-defining planar sections are blanked out of said strip stock in juxtaposed pairs, separated by a narrow, longitudinally disposed central rib portion of strip stock which, together with longitudinally extending unblanked edge portions of strip stock, form a strip stock skeleton.

12. A method in accordance with claim 7 further comprising the step of forming at least one spaced array of pilot holes in said strip stock prior to the step of forming said protuberances therein.

13. A method in accordance with claim 12 further comprising the step of forming a second spaced array of pilot holes in said strip stock immediately after the step of securing said insulative film thereto.

14. A method in accordance with claim 7 wherein said film is initially processed with a plurality of spaced bubble areas, the dimensions of each being sufficient to confine a different array of protuberances.

15. A method in accordance with claim 7 wherein said film is pressure-bonded to said strip stock along at least those longitudinally extending areas of the latter that define longitudinal border areas of each of said sleeve sections.

16. A method in accordance with claim 7 further comprising the step of forming each of said planar sleeve sections with a ridge along and adjacent each longitudinally extending edge thereof, and on the side of said protuberances, said ridges increasing the rigidity of said sleeve, as formed, and functioning as spacers for said liner.

17. A method in accordance with claim 16 further comprising the step of forming each of said planar sleeve sections with raised protrusions along and adjacent to the mutually disposed, laterally extending edges thereof, and on the side of said protuberances, said raised protrusions also functioning as spacers for said liner.

18. A method of assembling a thin, perforable insulative liner as part of a deformable electrical connector of the open-ended type having inner and outer metallic sleeves confined within an insulative jacket, said inner metallic sleeve being adapted to receive insulated conductors and formed with a plurality of sharp, inwardly extending protuberances which, in response to a crimping type of deformation of the connector, pierce the insulation of each adjacent conductor inserted within the sleeve and, thereby, effect reliable contact with and conductive continuity between the metallic cores of the conductors, said method including the steps of:

forming a plurality of sharp, outwardly extending insulation-piercing protuberances on one side of and in at least one array in each of a succession of spaced regions along an indexably advanced supply of metallic strip stock, each array of protuberances encompassing at least a substantial central portion of each associated region;

positioning a thin, perforable, insulative film-defining liner on and in overlying relationship with each array fromed in each successively spaced region of said strip stock, with at least a portion of each liner extending beyond each associated and underlying array of protuberances on the side thereof that ultimately will be nearest the open conductor-receiving end of the assembled connector, and securing at least said extended portion of each liner, with pressure applied thereagainst, to an underlying and unperforated border area of each associated strip stock region;

progressively blanking out said strip stock into a skeleton pattern of interconnected and longitudinally extending inner sleeve-defining planar sections interconnected by unblanked portions of said strip stock;

forming each of said inner planar sleeve sections into at least a substantially hollow sleeve, with said film-defining liner being secured to the inner surface thereof so as to form a circumferentially disposed, single wall liner having no discontinuities at least over the area thereof that is coextensive with each underlying array of protuberances, and while still integrally supported by unblanked portions of said strip stock, and severing each formed inner sleeve and associated liner from the remaining interconnecting portions of said strip stock as a composite insert for use in the further assembly of said connector.

19. A method in accordance with claim 18 wherein said insulative film is initially positioned on, and is secured to said strip stock at least along predetermined longitudinally extending areas of the latter while said film is advanced in roll stock from therewith, said secured areas including said border area of each successive sleeve-forming strip stock region that will ultimately be nearest the open end of the assembled connector.

20. A method in accordance with claim 18 wherein said insulative film is applied to each of said sleeve sections in the form of a discrete liner after the blanking of said strip stock.

21. A method in accordance with claim 18 wherein said insulative film is secured in roll stock form to said strip stock after the blanking thereof, and further including the step of blanking out said longitudinally extending secured film so as to form discrete liners that are each coextensive with a different previously formed planar sleeve section.

22. A method in accordance with claim 18 wherein said insulative liner extends beyond all sides of the underlying array of protuberances, and with said extended areas being bonded to the underlying unperforated border areas of each sleeve-forming strip stock region.

23. A method in accordance with claim 22 further comprising the steps of forming each of said planar sleeve sections with a ridge along and adjacent each longitudinally extending edge thereof, and with raised protrusions along and adjacent to the mutually disposed, laterally extending edges of each sleeve section, said ridges and raised protrusions functioning, at least in part, as spacers for said liner.

24. A method of assembling a thin, perforable insulative liner as part of a deformable electrical connector of the open-ended type having at least coaxially telescopically disposed first and second sleeves confined within an outer, insulative jacket, with said inner metallic sleeve being adapted to receive insulated conductors and formed with a plurality of sharp, inwardly extending protuberances which, in response to a crimping type of deformation of the connector, pierce the insulation of each adjacent conductor inserted within the sleeve and, thereby, effect reliable contact with and conductive continuity between the metallic cores of the conductors, said method comprising the steps of:

blanking out of an indexably advanced supply of metallic strip stock a succession of longitudinally spaced inner sleeve-defining planar sections interconnected by unblanked portions of said strip stock;

forming a plurality of sharp, outwardly extending insulation-piercing protuberances in an array within the borders of and on one side of each of said sleeve sections in succession;

positioning a thin, perforable insulative film in overlying relationship with each of said sleeve sections on the side of said protuberances, and securing at least preselected areas of said film to mating areas of each underlying sleeve section;

forming at least the major portion of each of said sleeve sections into at least a substantially hollow film-lined sleeve, and while still integrally supported by unblanked portions of said strip stock;

severing each formed inner sleeve and associated liner from the remaining interconnecting portions of said strip stock;

inserting each inner sleeve and associated liner as a composite insert within an associated outer sleeve made of a malleable and, thereby, readily deformable material, and applying an insulative plastic jacket about said outer sleeve in form-fitting relationship therewith, and leaving at least one end of said second sleeve open, with an inwardly tapered jacket flange formed adjacent thereto so that conductors may be readily inserted into the bore of said assembled connector.

25. A method in accordance with claim 24 wherein said insulative film is initially in roll stock form and is blanked out to form discrete liners which are successively positioned in overlying relationship with said sleeve sections when respectively advanced into alignment therewith, each of said discrete liners being dimensioned so as to have a border area that extends beyond at least the side of said array of protuberances that will ultimately be nearest the open end of said assembled connector, and securing at least said extended border area of said liner to the underlying sleeve section.

26. A method in accordance with claim 25 wherein each of said discrete liners is dimensioned so as to define a continuous border area that extends beyond all sides of the array of protuberances, said liner border areas thereafter being bonded to underlying, unperforated border areas of the associated sleeve section, thereby providing a smoothly tapered liner transition from the bonded border areas thereof to the major central area thereof that overlies the distal ends of the array of protuberances.

27. A method in accordance with claim 25 further comprising the step of forming each of said planar sleeve sections with a ridge along and adjacent each longitudinally extending edge thereof, and on the side of said protuberances, said ridges increasing the rigidity of said sleeve, as formed, and functioning as spacers for said liner.

28. A method in accordance with claim 27 further comprising the step of forming each of said planar sleeve sections with raised protrusions along and adjacent to the mutually disposed, laterally extending edges thereof, and on the side of said protuberances, said raised protrusions also functioning as spacers for said liner.

29. A method in accordance with claim 24 further comprising the step of forming a series of pilot holes within said strip stock along the central region thereof prior to the strip stock blanking operation to form the sleeve sections.

30. A method in accordance with claim 29 further comprising the step of forming a series of elongated openings along the central region of the strip stock, said openings at least partially compensating for the expansion and contraction of said stock during the various processing operations performed thereon.

* * * * *